(12) United States Patent
Nagura

(10) Patent No.: US 12,050,384 B2
(45) Date of Patent: Jul. 30, 2024

(54) ELECTROOPTIC SUBSTRATE, LIQUID CRYSTAL DISPLAY DEVICE, AND ELECTRONIC APPARATUS

(71) Applicant: SONY SEMICONDUCTOR SOLUTIONS CORPORATION, Kanagawa (JP)

(72) Inventor: Moriyasu Nagura, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/998,786

(22) PCT Filed: Apr. 28, 2021

(86) PCT No.: PCT/JP2021/017073
§ 371 (c)(1),
(2) Date: Nov. 14, 2022

(87) PCT Pub. No.: WO2021/241127
PCT Pub. Date: Dec. 2, 2021

(65) Prior Publication Data
US 2023/0168547 A1   Jun. 1, 2023

(30) Foreign Application Priority Data
May 25, 2020   (JP) .................................. 2020-090254

(51) Int. Cl.
*G02F 1/1343* (2006.01)
*G02F 1/1335* (2006.01)
(52) U.S. Cl.
CPC .. *G02F 1/134336* (2013.01); *G02F 1/133512* (2013.01); *G02F 1/133531* (2021.01); *G02F 1/133548* (2021.01)

(58) Field of Classification Search
CPC ......... G02F 1/134336; G02F 1/133512; G02F 1/133531; G02F 1/133548
See application file for complete search history.

(56) References Cited

U.S. PATENT DOCUMENTS 9,423,646 B2   8/2016   Nam et al.
2018/0101054 A1*   4/2018   Zha .................. G02F 1/133528

FOREIGN PATENT DOCUMENTS

JP   05-241514 A   9/1993
JP   2003-107505 A   4/2003
(Continued)

OTHER PUBLICATIONS

Futamura, JP2015-197578, machine translation Nov. 2015 (Year: 2015).*

(Continued)

*Primary Examiner* — Tracie Y Green
(74) *Attorney, Agent, or Firm* — CHIP LAW GROUP

(57) ABSTRACT

Provide is an electrooptic substrate in which a phase shift of light reflected at the interface or the like does not affect a display state, a liquid crystal display device, and an electronic apparatus. A liquid crystal display device includes: an electrooptic substrate including a support base and transparent pixel electrodes disposed in a matrix on a front surface side of the support base; a counter substrate disposed to be opposed to the electrooptic substrate; and a liquid crystal material layer sealed between the electrooptic substrate and the counter substrate, in which a light guide corresponding to each of the transparent pixel electrodes is provided on a back surface side of the transparent pixel electrode, and a polarizer is disposed between the light guide and the transparent pixel electrode.

11 Claims, 35 Drawing Sheets

(56) References Cited

FOREIGN PATENT DOCUMENTS

| | | | |
|---|---|---|---|
| JP | 2007-171802 | A | 7/2007 |
| JP | 2010-134270 | A | 6/2010 |
| JP | 2015-197578 | A | 11/2015 |
| JP | 2018-185418 | A | 11/2018 |
| WO | 2019/235046 | A1 | 12/2019 |

OTHER PUBLICATIONS

International Search Report and Written Opinion of PCT Application No. PCT/JP2021/017073, issued on Jun. 22, 2021, 13 pages of ISRWO.

* cited by examiner

ELECTROOPTIC SUBSTRATE, LIQUID CRYSTAL DISPLAY DEVICE, AND ELECTRONIC APPARATUS

CROSS REFERENCE TO RELATED APPLICATIONS

This application is a U.S. National Phase of International Patent Application No. PCT/JP2021/017073 filed on Apr. 28, 2021, which claims priority benefit of Japanese Patent Application No. JP 2020-090254 filed in the Japan Patent Office on May 25, 2020. Each of the above-referenced applications is hereby incorporated herein by reference in its entirety.

TECHNICAL FIELD

The present disclosure relates to an electrooptic substrate, a liquid crystal display device, and an electronic apparatus.

BACKGROUND ART

A liquid crystal display device is known which includes an electrooptic substrate on which transparent pixel electrodes disposed in a matrix are disposed, a counter substrate disposed to be opposed to the electrooptic substrate, and a liquid crystal material layer sealed between the electrooptic substrate and the counter substrate. The liquid crystal display device displays an image by operating a pixel as an optical shutter (light valve). In recent years, the liquid crystal display device has been required to have high definition and high luminance.

In an active matrix-type liquid crystal display device, after a voltage is applied to a transparent pixel electrode via a switching element (for example, a transistor), the transistor is brought into a non-conductive state. Then, a pixel capacitor holds the voltage to perform display. Therefore, when a leakage current flows through the transistor to be in the non-conductive state, the holding voltage changes, and as a result, the display quality deteriorates. Furthermore, when light enters the transistor, carriers are induced, and the leakage current increases.

When a traveling direction of the light traveling in a direction of entering the transistor can be changed and used as light contributing to display, it is possible to ensure the high luminance of the display device and reduce the leakage current of the transistor. For example, Patent Document 1 discloses a technique of providing a waveguide structure in an opening region to increase the amount of light to be emitted and to prevent light from being incident on the transistor.

CITATION LIST

Patent Document

Patent Document 1: Japanese Patent Application Laid-Open No. 2018-185418

SUMMARY OF THE INVENTION

Problems to be Solved by the Invention

In the light reflected at the interface or the like, a phase shift called a Goos-Hänchen shift occurs. Therefore, a phase difference is generated between light passing through a waveguide without being reflected and light passing through the waveguide after being reflected at the interface or the like. As a result, a part of the light emitted from the waveguide may be transmitted through a polarizer on an emission side even in a black display state, or a part of the light emitted from the waveguide may not be transmitted through the polarizer on the emission side in a white display state. These cause a decrease in contrast of the displayed image.

Accordingly, an object of the present disclosure is to provide an electrooptic substrate in which a phase shift of light reflected at the interface or the like does not affect a display state, a liquid crystal display device, and an electronic apparatus.

Solutions to Problems

An electrooptic substrate according to the present disclosure for achieving the above object includes:
a support base; and transparent pixel electrodes disposed in a matrix on a front surface side of the support base,
in which a light guide corresponding to each of the transparent pixel electrodes is provided on a back surface side of the transparent pixel electrode, and
a polarizer is disposed between the light guide and the transparent pixel electrode.

A liquid crystal display device according to the present disclosure for achieving the above object includes:
an electrooptic substrate including a support base and transparent pixel electrodes disposed in a matrix on a front surface side of the support base;
a counter substrate disposed to be opposed to the electrooptic substrate; and
a liquid crystal material layer sealed between the electrooptic substrate and the counter substrate,
in which a light guide corresponding to each of the transparent pixel electrodes is provided on a back surface side of the transparent pixel electrode, and
a polarizer is disposed between the light guide and the transparent pixel electrode.

An electronic apparatus according to the present disclosure for achieving the above object includes a liquid crystal display device, the liquid crystal display device including:
an electrooptic substrate including a support base and transparent pixel electrodes disposed in a matrix on a front surface side of the support base;
a counter substrate disposed to be opposed to the electrooptic substrate; and
a liquid crystal material layer sealed between the electrooptic substrate and the counter substrate,
in which a light guide corresponding to each of the transparent pixel electrodes is provided on a back surface side of the transparent pixel electrode, and
a polarizer is disposed between the light guide and the transparent pixel electrode.

BRIEF DESCRIPTION OF DRAWINGS

FIG. 33A illustrates a front view thereof and FIG. 33B illustrates a rear view thereof.

MODE FOR CARRYING OUT THE INVENTION

Figure 1:
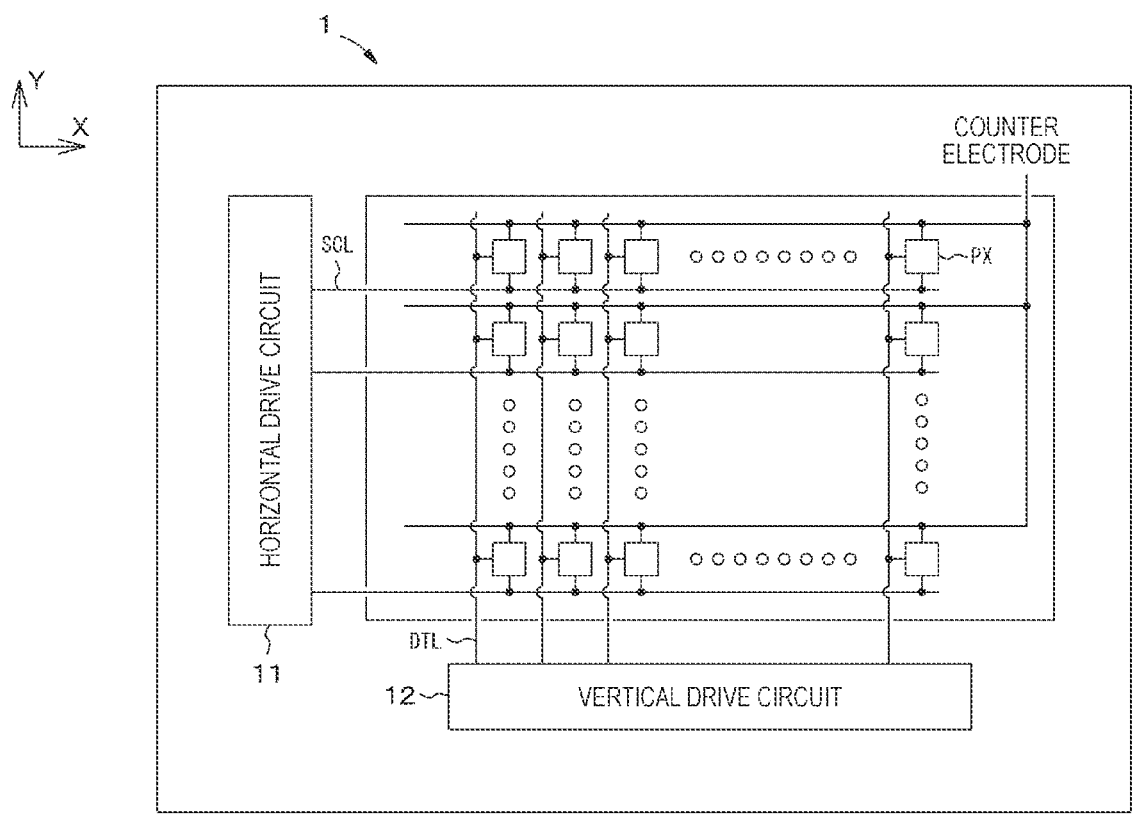
FIG. 1 is a schematic diagram of a liquid crystal display device according to a first embodiment of the present disclosure.

Hereinafter, the present disclosure will be described on the basis of embodiments with reference to the drawings. The present disclosure is not limited to the embodiments, and various numerical values and materials in the embodiments are provided as examples. In the following description, the same reference numerals will be used for the same elements or elements having the same functions, and overlapping description will be omitted. Note that the description will be given in the following order.
1. Overall Description of Electrooptic Substrate, Liquid crystal Display Device, and Electronic Apparatus according to Present Disclosure.
2. First Embodiment
3. Second Embodiment
4. Third Embodiment
5. Description of Electronic Apparatus
6. Others

[Overall Description of Electrooptic Substrate, Liquid Crystal Display Device, and Electronic Apparatus According to Present Disclosure]

In the following description, a liquid crystal display device according to the present disclosure and a liquid crystal display device used in an electronic apparatus according to the present disclosure may be simply referred to as a "liquid crystal display device of the present disclosure". Furthermore, an electrooptic substrate according to the present disclosure and an electrooptic substrate used in the liquid crystal display device of the present disclosure may be simply referred to as an "electrooptic substrate of the present disclosure".

As described above, the electrooptic substrate of the present disclosure includes a support base and transparent pixel electrodes disposed in a matrix on a front surface side of the support base, a light guide corresponding to each of the transparent pixel electrodes is provided on a back surface side of the transparent pixel electrode, and a polarizer is disposed between the light guide and the transparent pixel electrode.

In this case, the light guide can be configured to include a light-transmissive material that extends in a normal direction with respect to the support base and is disposed such that the wall surface of the light guide is in contact with a material having a relatively low refractive index. For example, the light guide can be configured by providing an opening in a silicon oxide layer and embedding silicon oxynitride in the opening. The material configuring the light guide and the periphery of the light guide is not particularly limited, and is only required to be appropriately selected according to the configuration of the electrooptic substrate.

Alternatively, the light guide can be configured to include a light shielding material that extends in the normal direction with respect to the support base and is disposed so as to surround the wall surface of the light-transmissive material located in a light guide region. In this case, the light shielding material can be configured to include a metal material such as aluminum (Al), an aluminum alloy such as Al—Cu or Al—Si, or silver (Ag).

In the electrooptic substrate of the present disclosure including the various preferable configurations described above, the polarizer can be configured to include a wire grid polarizer. In this case, a ratio between a transmittance of the wire grid polarizer in a transmission direction and a transmittance in a direction orthogonal to the transmission direction is preferably $3 \times 10^3$ or greater with respect to light having a wavelength of 550 nanometers. The wire grid polarizer can be obtained by, for example, a step of performing patterning on a thin film of aluminum (Al) and appropriately covering the thin film with a protective film.

In this case, the polarizer can be configured to be electrically floating. Alternatively, a predetermined voltage can be applied to the polarizer. For example, the same voltage as the voltage applied to the transparent pixel electrode can be applied to the polarizer. Alternatively, a so-called common potential line can be electrically connected to the polarizer, and the common potential can be supplied to the polarizer.

In the electrooptic substrate of the present disclosure including the above-described various preferable configurations, another polarizer may be further disposed on the back surface side of the support base. For example, in a case where an extinction ratio due to the wire grid polarizer is insufficient, a required extinction ratio can be secured by further disposing another polarizer.

As the support base used for the electrooptic substrate, a substrate including a transparent material such as glass or quartz can be used. The same applies to a base used for the counter substrate. The transparent pixel electrode and a counter electrode provided on the counter substrate can be formed using a transparent conductive material such as indium tin oxide (ITO) or indium zinc oxide (IZO). Note that, in some cases, a metal film thinned so as to have optical transparency can also be used. The counter electrode functions as a common electrode for each pixel of the liquid crystal display device.

In the electrooptic substrate of the present disclosure, a thin film transistor constituting the switching element can be formed by forming and processing a semiconductor material layer or the like on the base.

Materials for various wirings and contacts used in the present disclosure are not particularly limited, and for example, metal materials such as aluminum (Al), an aluminum alloy such as Al—Cu or Al—Si, tungsten (W), or a tungsten alloy such as tungsten silicide ($WSi_x$) can be used.

A material constituting an insulating layer or the insulating film used in the present disclosure is not particularly limited as long as it does not interfere with the implementation of the present disclosure. For example, an inorganic material such as silicon oxide or an organic material such as polyimide can be used.

The liquid crystal display device may be configured to display a monochrome image or a color image. In addition to U-XGA (1600, 1200), HD-TV (1920, 1080), and Q-XGA (2048, 1536), some of image resolutions such as (3840, 2160) and (7680, 4320) can be exemplified as a value of the pixel of the liquid crystal display device, but the value is not limited to these values.

Furthermore, examples of the electronic apparatus including the liquid crystal display device of the present disclosure include various electronic apparatuses having an image display function in addition to a direct-view type or projection-type display device.

Various conditions in the present specification are satisfied not only in a case where they are strictly satisfied but also in a case where they are substantially satisfied. The presence of various variations caused at the time of design or manufacturing is allowed. Furthermore, the drawings used in the following description indicates schematic views, and do not indicate actual dimensions or ratios thereof.

First Embodiment

The first embodiment relates to an electrooptic substrate, a liquid crystal display device, and an electronic apparatus according to present disclosure.

FIG. 1 is a schematic diagram for explaining a liquid crystal display device according to the first embodiment of the present disclosure.

The liquid crystal display device according to the first embodiment is an active matrix-type liquid crystal display device. As illustrated in FIG. 1, a liquid crystal display device 1 includes various circuits such as pixels PX disposed in a matrix, a horizontal drive circuit 11 for driving the pixels PX, and a vertical drive circuit 12 for driving the pixels PX. A reference sign SCL denotes a scanning line for scanning each of the pixels PX, and a reference sign DTL denotes a signal line for supplying various voltages to the pixel PX. For example, M pixels PX are disposed in a horizontal direction, N pixels PX are disposed in a vertical direction, and a total of M×N pixels PX are disposed in a matrix. A counter electrode illustrated in FIG. 1 is provided as a common electrode for each liquid crystal cell. Note that in an example illustrated in FIG. 1, each of the horizontal drive circuit 11 and the vertical drive circuit 12 is disposed on one end side of the liquid crystal display device 1, but this is merely an example.

Figure 2A:
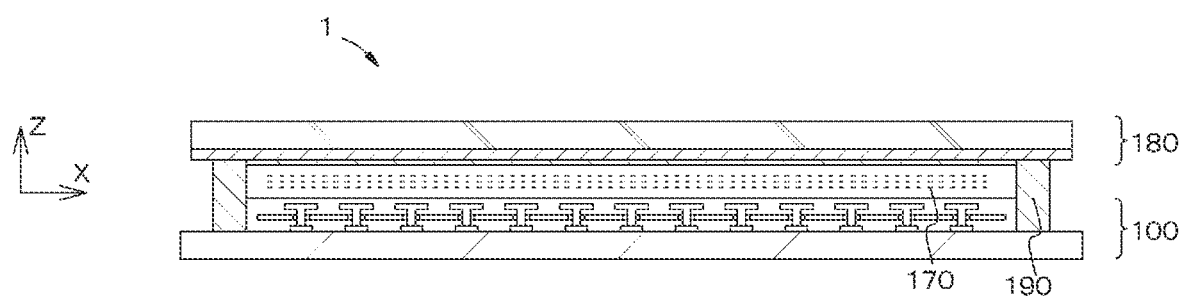
FIG. 2A is a schematic cross-sectional view for explaining a basic configuration of a liquid crystal display device.

FIG. 2A is a schematic cross-sectional view for explaining a basic configuration of the liquid crystal display device.

Figure 2B:
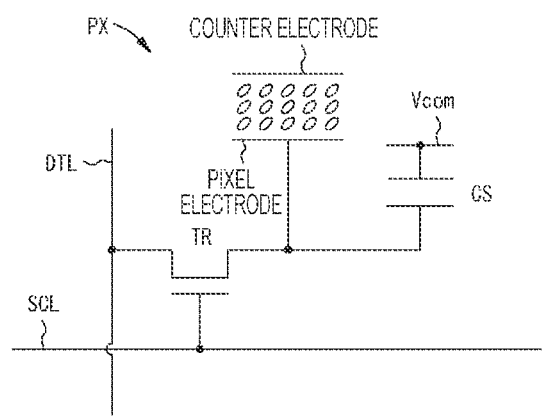
FIG. 2B is a schematic circuit diagram for explaining a pixel in a liquid crystal display device.

FIG. 2B is a schematic circuit diagram for explaining a pixel in a liquid crystal display device.

As illustrated in FIG. 2A, the liquid crystal display device 1 includes:
an electrooptic substrate 100 including a support base and transparent pixel electrodes disposed in a matrix on a front surface side of the support base;
a counter substrate 180 disposed to be opposed to the electrooptic substrate 100, and
a liquid crystal material layer 170 sealed between the electrooptic substrate 100 and the counter substrate 180. The electrooptic substrate 100 and the counter substrate 180 are sealed by a seal portion 190. The seal portion 190 has an annular shape surrounding the liquid crystal material layer 170. The liquid crystal display device 1 is a transmissive liquid crystal display device.

The counter substrate 180 is provided with a counter electrode including a transparent conductive material such as ITO. More specifically, the counter substrate 180 includes, for example, a rectangular substrate including quartz glass, a counter electrode provided on a surface on the liquid crystal material layer 170 side, and an alignment film provided on the counter electrode. Furthermore, a polarizing plate or the like is appropriately attached to the counter substrate 180. Note that, for convenience of illustration, the electrooptic substrate 100 and the counter substrate 180 in FIG. 2A are illustrated in a simplified manner.

As illustrated in FIG. 2B, the liquid crystal cell constituting the pixel PX includes a transparent pixel electrode provided on the electrooptic substrate 100, and a liquid crystal material layer or a counter electrode in a portion corresponding to the transparent pixel electrode. In order to prevent deterioration of the liquid crystal material layer, a positive or negative common potential $V_{com}$ is alternately applied to the counter electrode when the liquid crystal display device 1 is driven. Note that each element of the pixel PX excluding the liquid crystal material layer and the counter electrode is formed on the electrooptic substrate 100 illustrated in FIG. 2A.

As illustrated in FIG. 2B, one source/drain region of a thin film transistor TR is connected to a signal line DTL, and the other source/drain region is connected to the transparent pixel electrode and one electrode of a capacitor CS. The pixel voltage supplied from the signal line DTL is applied to the transparent pixel electrode via the thin film transistor TR brought into a conductive state by the scanning signal of a scanning line SCL. Since the transparent pixel electrode and one electrode of the capacitor CS are conductive, the pixel voltage is also applied to one electrode of the capacitor CS. Note that the common potential $V_{com}$ is applied to the other electrode of the capacitor. In this configuration, even after the thin film transistor TR is brought into a non-conductive state, the voltage of the transparent pixel electrode is held by the capacitance of the liquid crystal cell and the capacitor CS.

In the electrooptic substrate 100, a light guide corresponding to each transparent pixel electrode is formed, and a polarizer is disposed between the light guide and the transparent pixel electrode. First, planar shapes and stacking relationships thereof will be briefly described.

Figure 3:
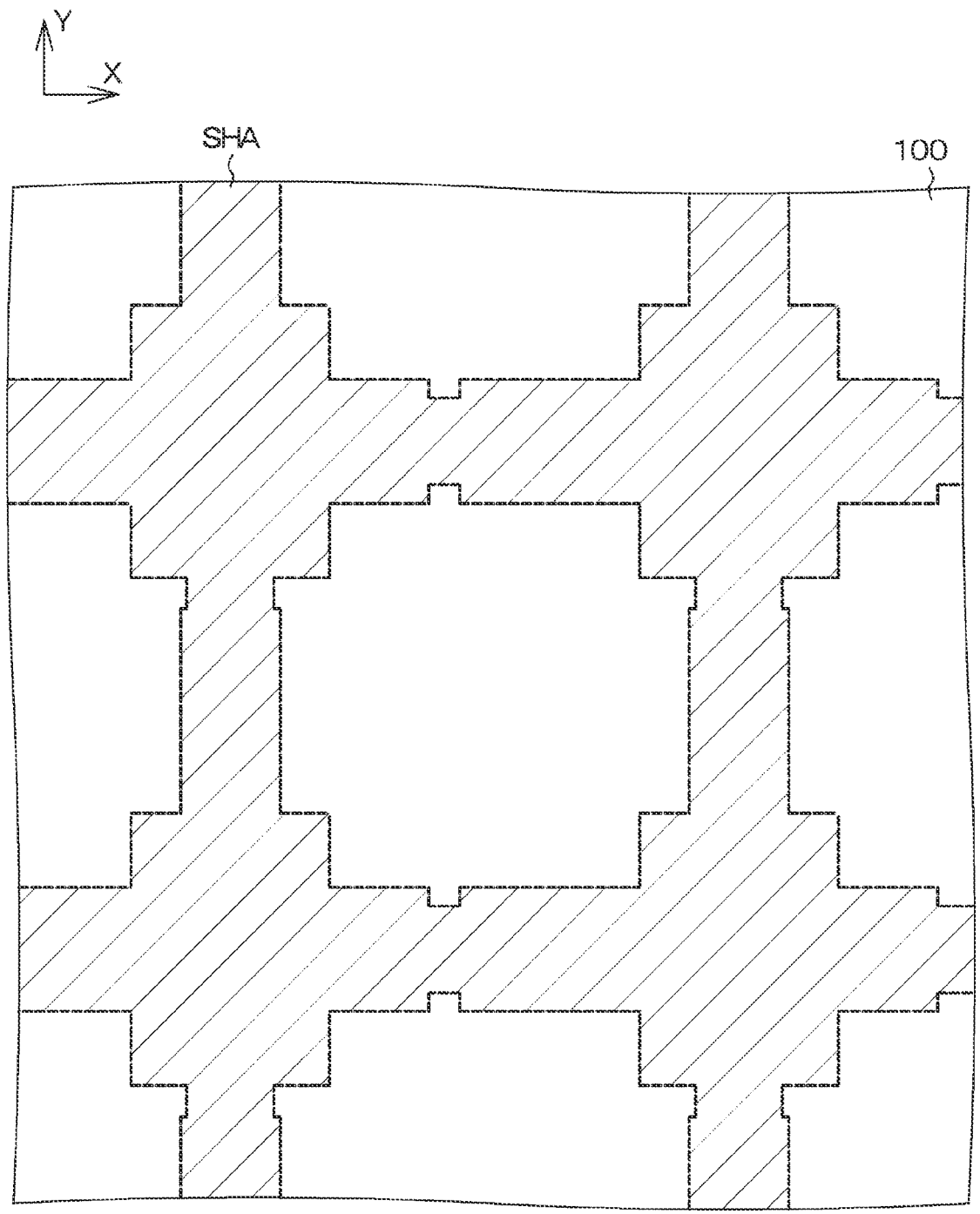
FIG. 3 is a schematic partial plan view for explaining a planar shape of a light shielding region in a liquid crystal display device.
Figure 4:
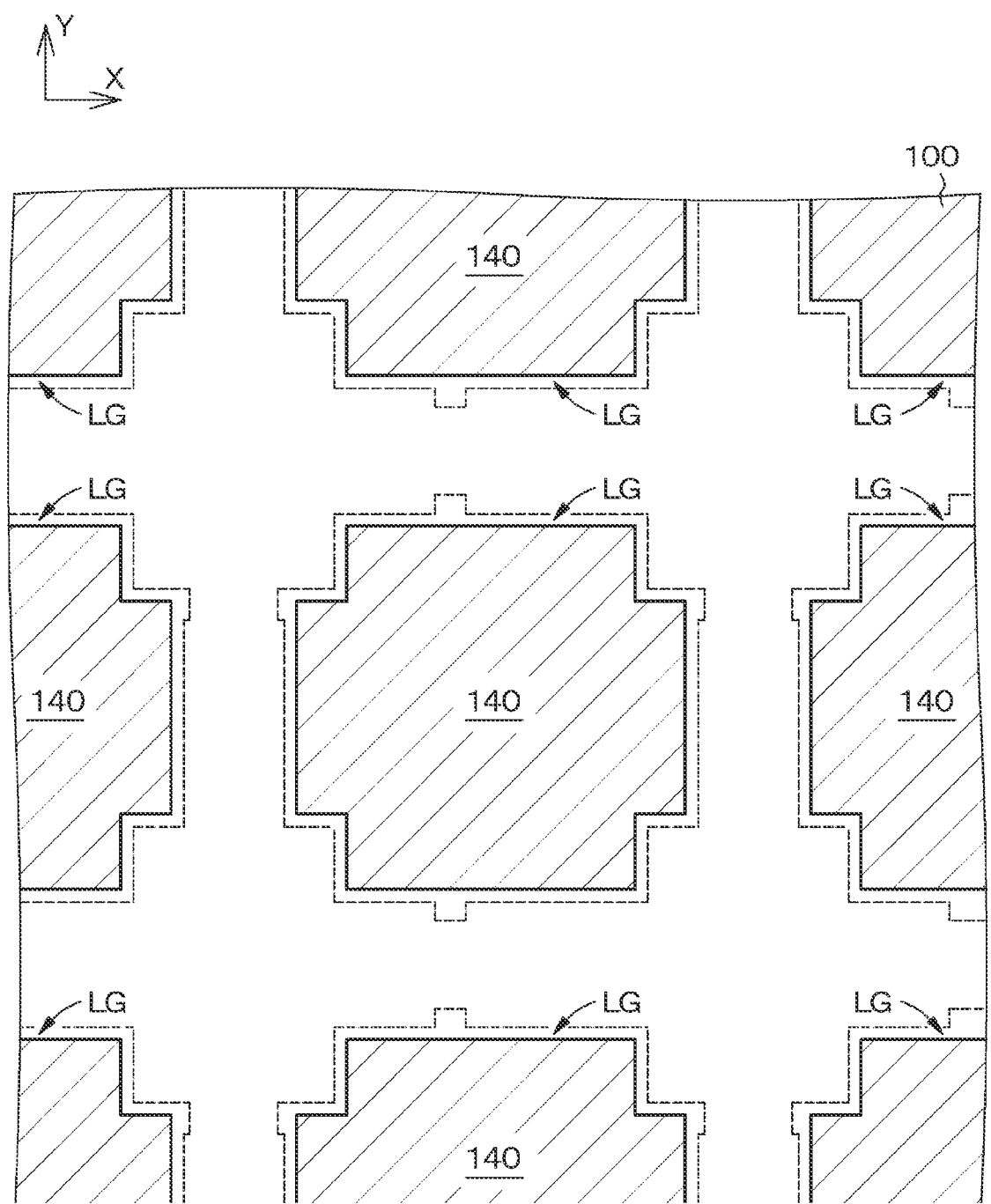
FIG. 4 is a schematic partial plan view for explaining a planar shape of a light guide in a liquid crystal display device.
Figure 5:
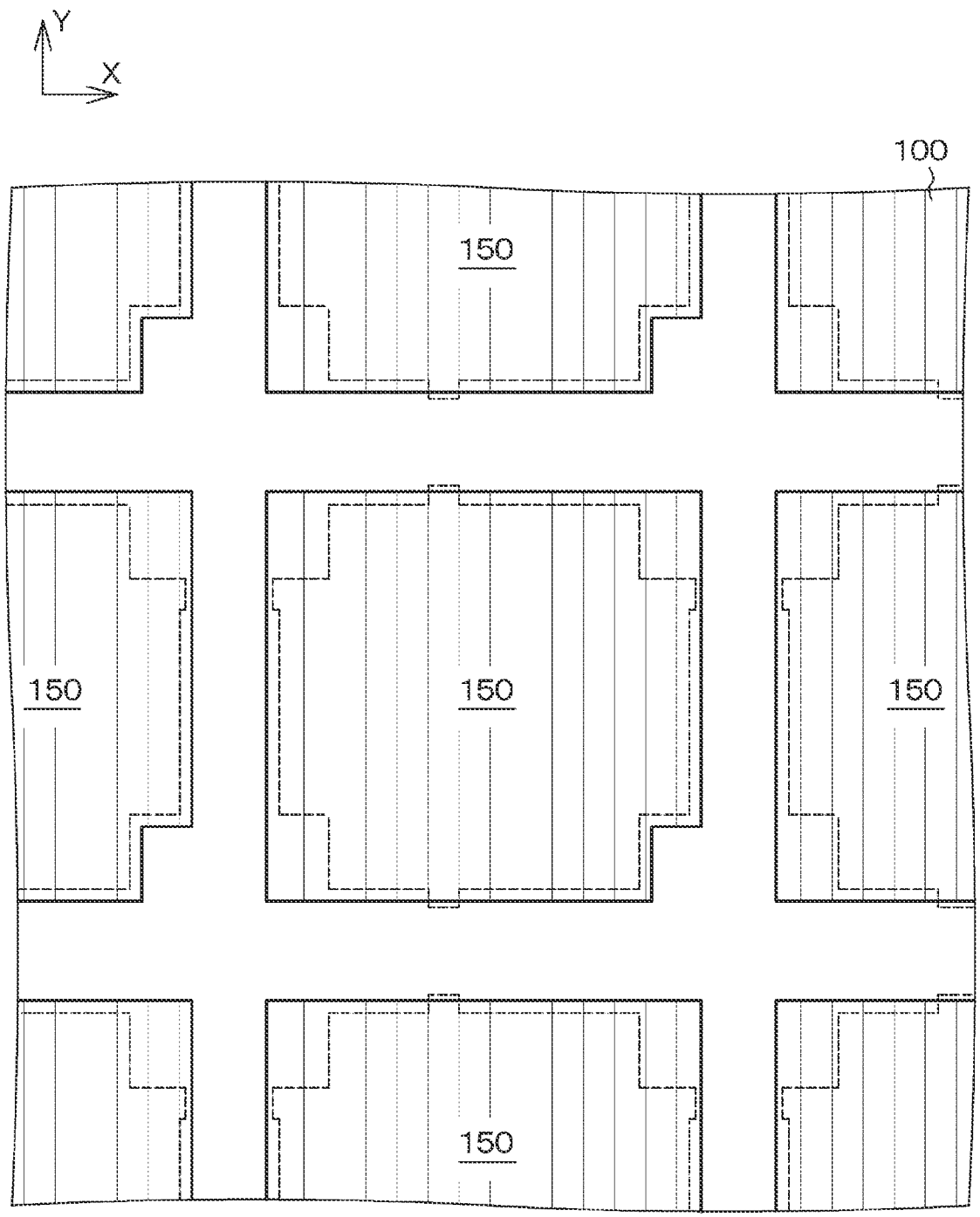
FIG. 5 is a schematic partial plan view for explaining a planar shape of a polarizer disposed between a light guide and a transparent pixel electrode in a liquid crystal display device.
Figure 6:
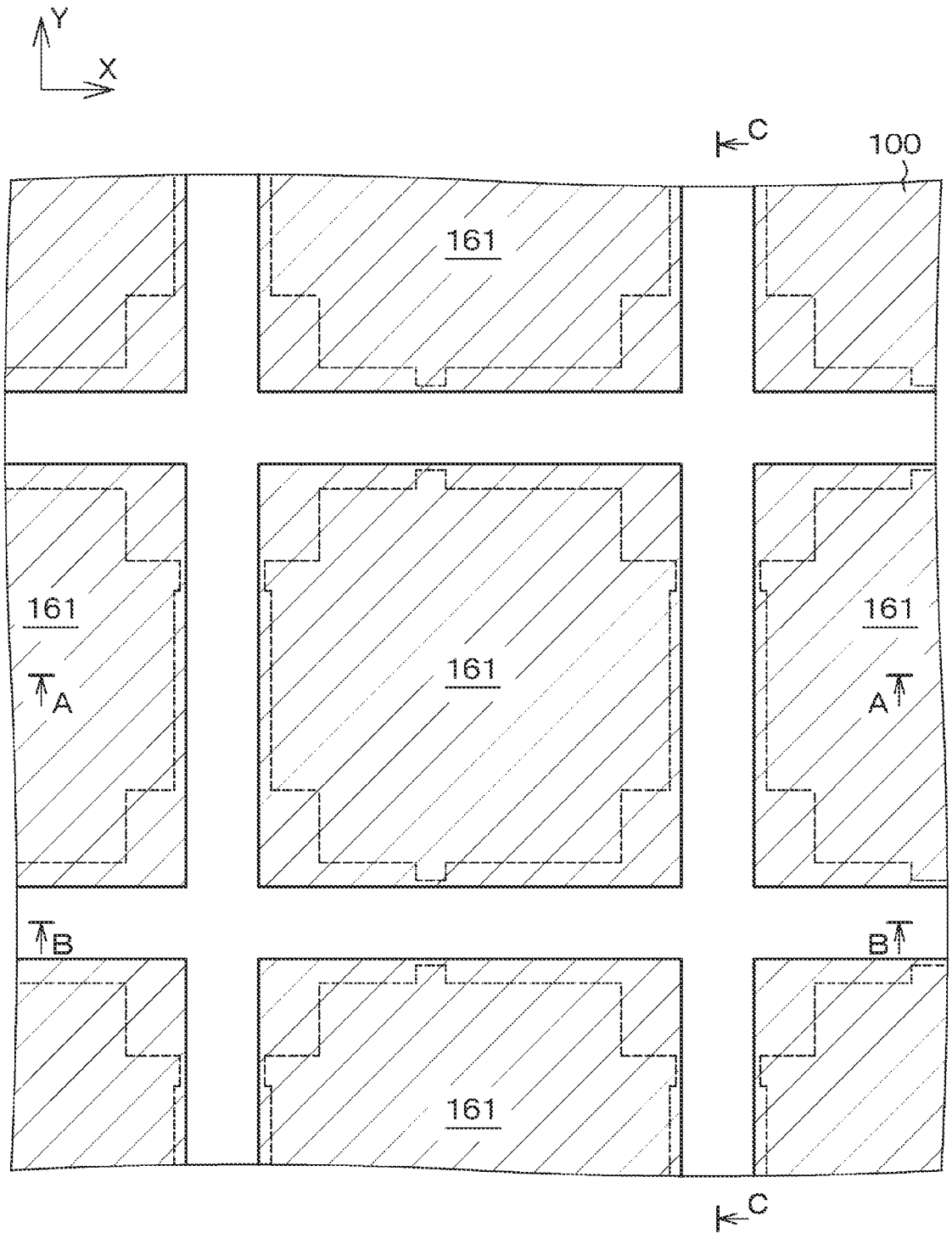
FIG. 6 is a schematic partial plan view for explaining a planar shape of a transparent pixel electrode in a liquid crystal display device.

FIG. 3 is a schematic partial plan view for explaining a planar shape of a light shielding region in the liquid crystal display device. FIG. 4 is a schematic partial plan view for explaining a planar shape of the light guide in the liquid crystal display device. FIG. 5 is a schematic partial plan view for explaining a planar shape of the polarizer disposed between the light guide and the transparent pixel electrode in the liquid crystal display device. FIG. 6 is a schematic partial plan view for explaining a planar shape of the transparent pixel electrode in the liquid crystal display device.

In addition to the scanning line SCL and the signal line DTL, various wirings and the like are formed on the electrooptic substrate 100. The light shielding region is formed in the liquid crystal display device 1 by these various wirings. In FIG. 3, a hatched portion indicates a planar shape of a light shielding region SHA formed by various wirings and the like. An opening region of the pixel is provided in a region not overlapping the light shielding region SHA.

Note that, since a large number of constituent elements are stacked in the electrooptic substrate 100, when all the elements are illustrated in a plan view, readability is impaired. Therefore, in FIGS. 3 to 6, only limited elements are displayed. A detailed arrangement relationship of each element will be described in detail with reference to FIGS. 7 to 9.

As illustrated in FIG. 4, a light guide LG is formed in a region not overlapping the light shielding region SHA. The light guide LG includes a light-transmissive material 140 extending in a normal direction with respect to the support base and disposed such that the wall surface of the light guide LG is in contact with a material having a relatively low refractive index. In FIG. 4, hatched regions indicate regions in which the light-transmissive material 140 is disposed.

A polarizer 150 illustrated in FIG. 5 is disposed above the light guide LG illustrated in FIG. 4. In FIG. 5, hatched regions indicate regions in which the polarizer 150 is disposed. The polarizer 150 includes a wire grid polarizer and is disposed corresponding to each light guide LG. Then, a transparent pixel electrode 161 illustrated in FIG. 6 is disposed above the polarizer 150. In FIG. 6, hatched regions indicate regions in which the transparent pixel electrode 161 is disposed.

As described above, in the electrooptic substrate 100, the transparent pixel electrode 161, the polarizer 150, and the light guide LG are sequentially stacked. Therefore, light incident on the transparent pixel electrode 161 through the liquid crystal material layer 170 first passes through the polarizer 150, and then reaches the light guide LG. Accordingly, the light reaches the light guide LG after passing through the polarizer 150. Although description will be made later with reference to FIG. 12, according to this structure, the display state is not affected even when the phase shift occurs due to the reflection of the light in the light guide LG.

Figure 7:
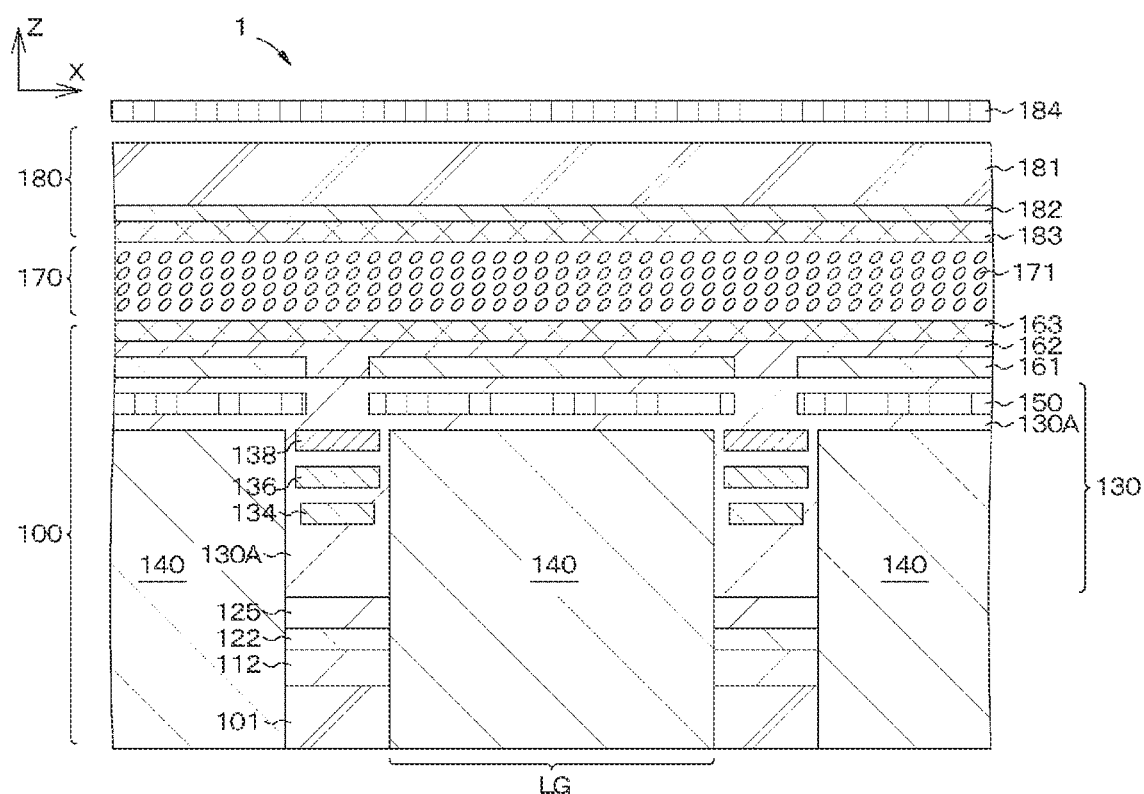
FIG. 7 is a schematic cross-sectional view of a liquid crystal display device taken along line A-A of FIG. 6.
Figure 8:
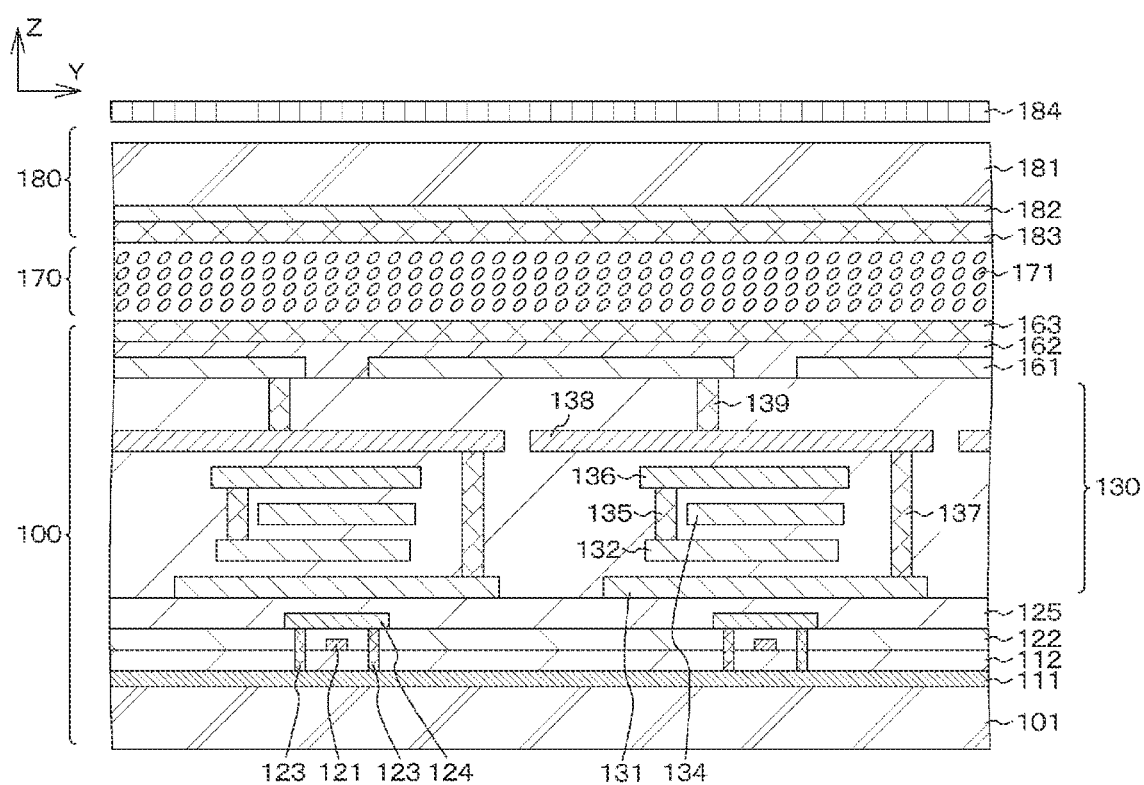
FIG. 8 is a schematic cross-sectional view of a liquid crystal display device taken along line B-B of FIG. 6.
Figure 9:
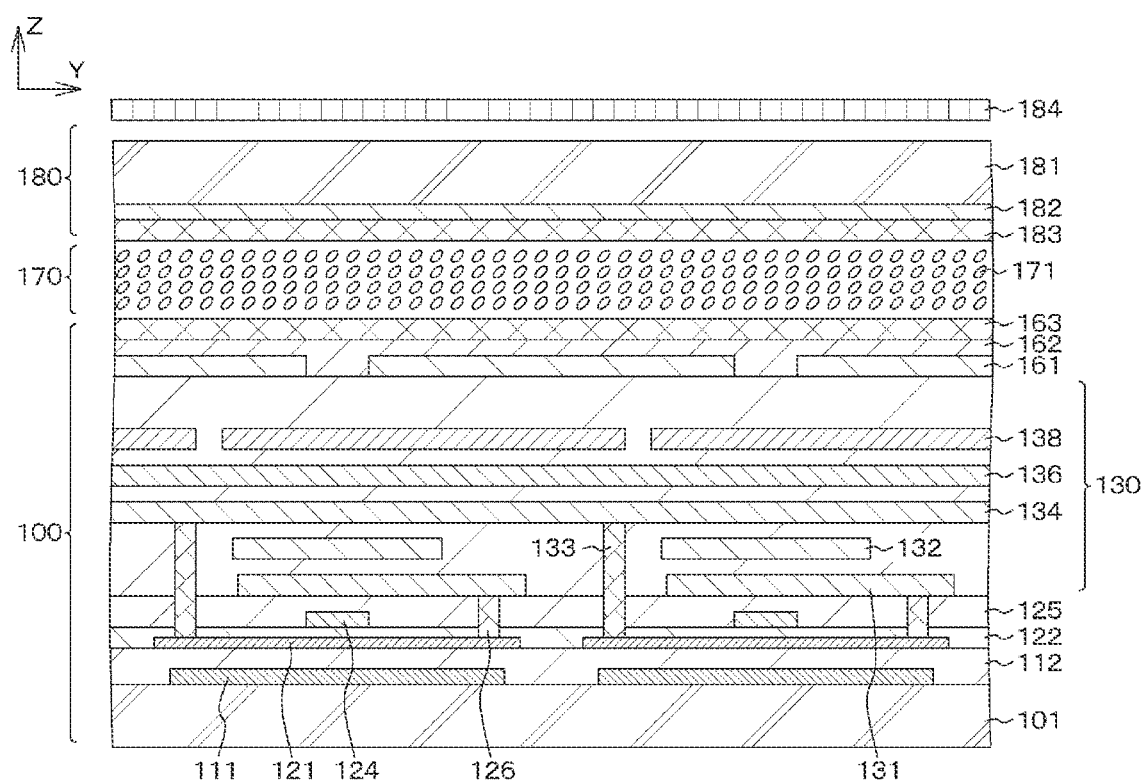
FIG. 9 is a schematic cross-sectional view of a liquid crystal display device taken along line C-C of FIG. 6.

Next, the structure of the liquid crystal display device 1 will be described in detail with reference to the cross-sectional view. FIG. 7 is a schematic cross-sectional view of the liquid crystal display device taken along line A-A of FIG. 6. FIG. 8 is a schematic cross-sectional view of the liquid crystal display device taken along line B-B of FIG. 6. FIG. 9 is a schematic cross-sectional view of the liquid crystal display device taken along line C-C of FIG. 6. Note that the planar shape of each element will be described with reference to FIGS. 13, 14, 15, 16, 17, 18, 19, 20, 21, 22A, 22B, 23A, 23B, 24, 25A, 25B, 25C, 25D, 25E, 25F, and 26 for explaining a manufacturing method of the liquid crystal display device 1 as appropriate.

Figure 13:
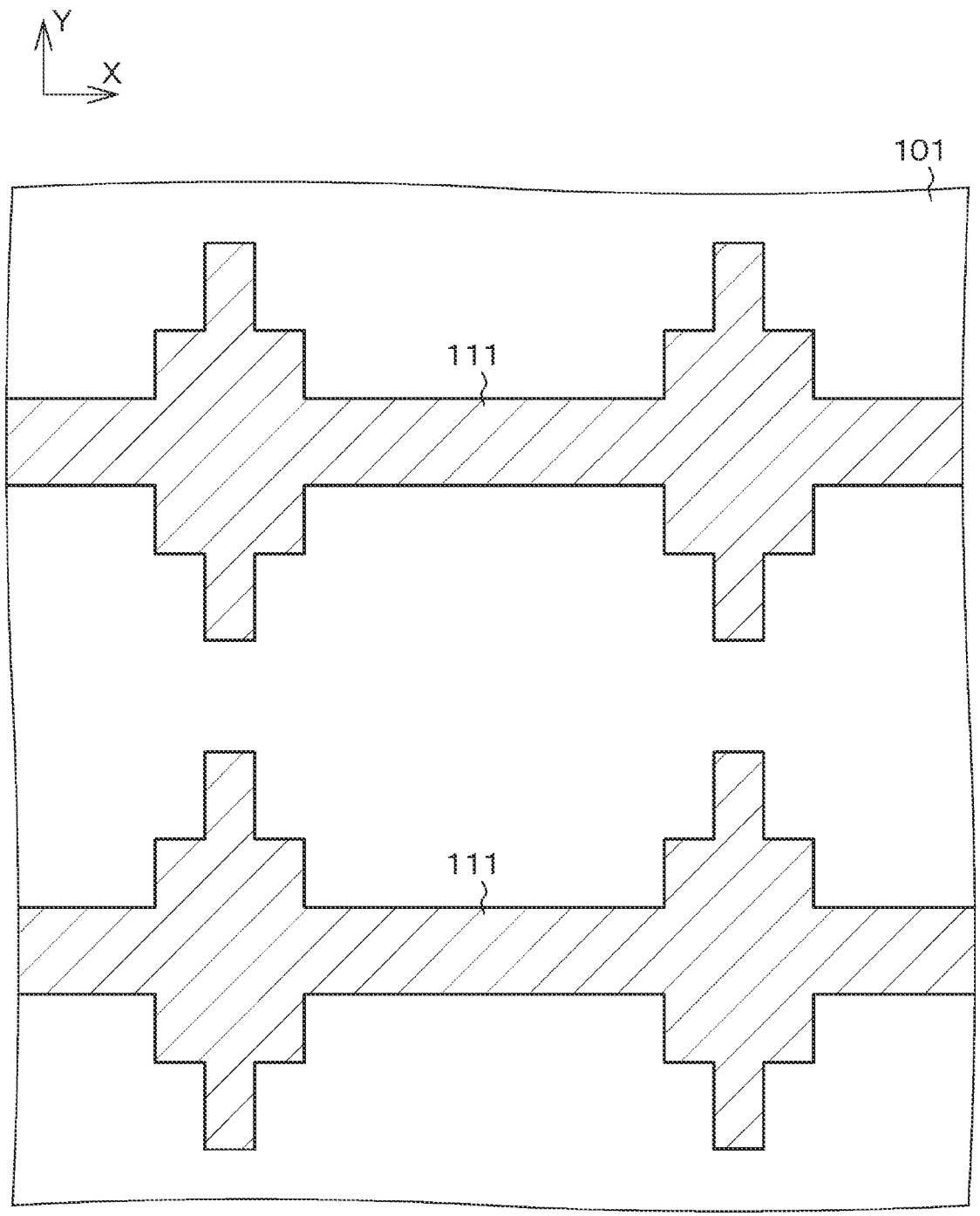
FIG. 13 is a schematic partial plan view of a base or the like for explaining a manufacturing method of a liquid crystal display device according to the first embodiment.

As illustrated in FIGS. 8 and 9, a scanning line 111 (corresponding to SCL in FIG. 1) extending in an X direction in the drawings is formed on a support base 101 constituting the electrooptic substrate 100. In FIG. 13, hatched portions indicate planar shapes of the scanning lines 111.

Figure 14:
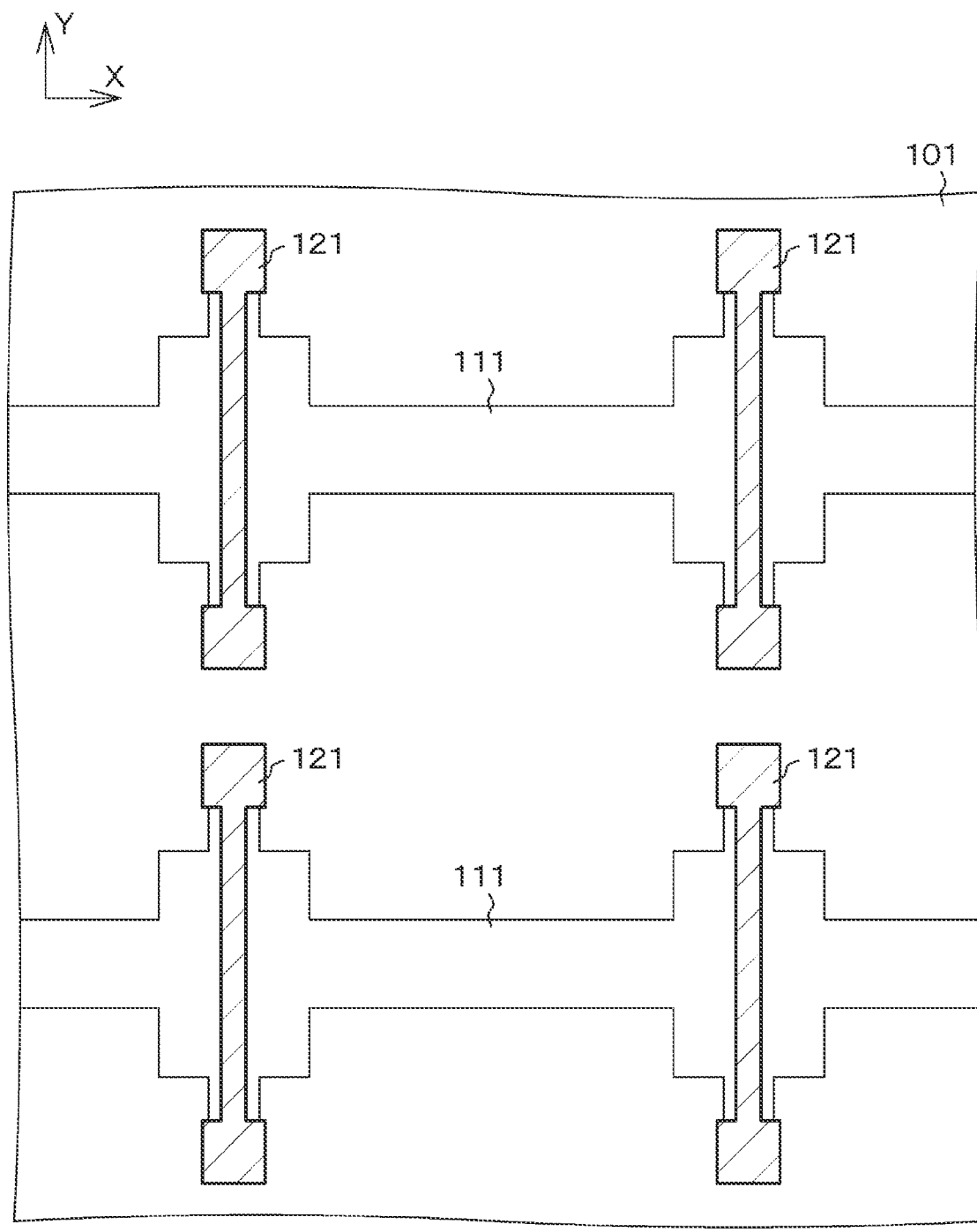
FIG. 14 is a schematic partial plan view of a base or the like for explaining a manufacturing method of a liquid crystal display device according to the first embodiment, subsequent to FIG. 13.
Figure 15:
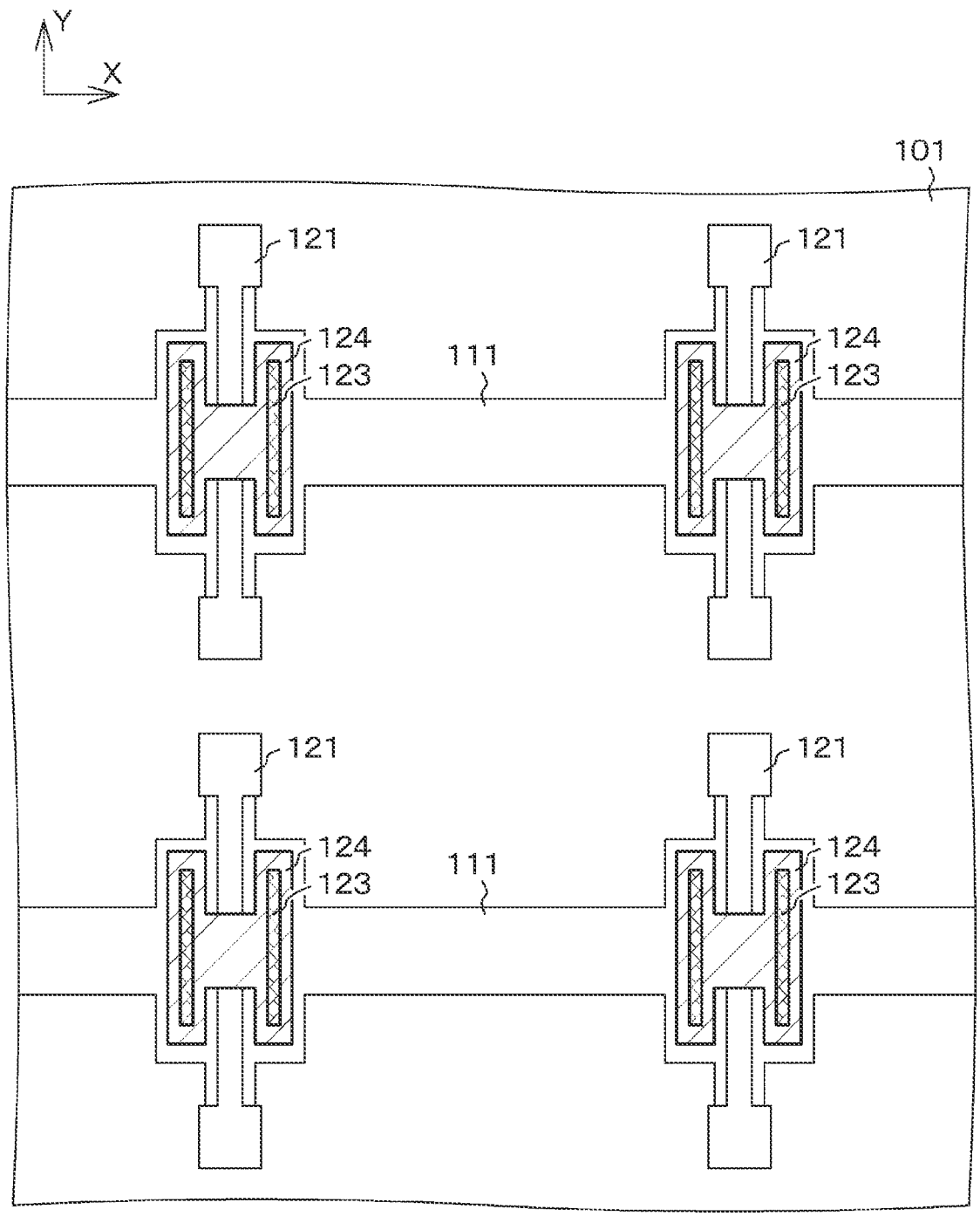
FIG. 15 is a schematic partial plan view of a base or the like for explaining a manufacturing method of a liquid crystal display device according to the first embodiment, subsequent to FIG. 14.

As illustrated in FIGS. 8 and 9, an insulating film 112 is formed on the entire surface including an upper side of the scanning line 111, and a semiconductor material layer 121 constituting the thin film transistor TR is formed on the insulating film 112. In FIG. 14, hatched portions indicate planar shapes of the semiconductor material layers 121. As illustrated in FIGS. 8 and 9, a gate insulating film 122 is formed on the entire surface including an upper side of the semiconductor material layer 121, and a gate electrode 124 is formed on the gate insulating film 122. As illustrated in FIG. 8, the gate insulating film 122 and the insulating film 112 are provided with an opening through which the scanning line 111 is exposed, and a contact 123 between the gate electrode 124 and the scanning line 111 is formed in this portion. In FIG. 15, hatched portions indicate planar shapes of the gate electrode 124 and the contact 123.

As illustrated in FIGS. 8 and 9, an insulating film 125 is formed on the entire surface including an upper side of the gate electrode 124. On the insulating film 125, a wiring layer 130 including a light shielding film 131 and the like located above the thin film transistor TR is formed. The wiring layer 130 is formed by stacking a plurality of material layers, and the stacked wiring, electrodes, and the like are separated by an insulating layer. In the following description, various insulating layers constituting the wiring layer 130 may be represented by using a reference sign 130A.

The light shielding film 131 includes a conductive material having a light shielding property. As illustrated in FIG. 9, the insulating film 125 and the gate insulating film 122 are provided with an opening through which the semiconductor material layer 121 is exposed, and a contact 126 is formed in this portion. The light shielding film 131 is electrically connected to the other source/drain region of the thin film transistor TR via the contact 126. A pixel voltage is applied to the light shielding film 131 from the signal line via the thin film transistor TR brought into a conductive state.

Figure 16:
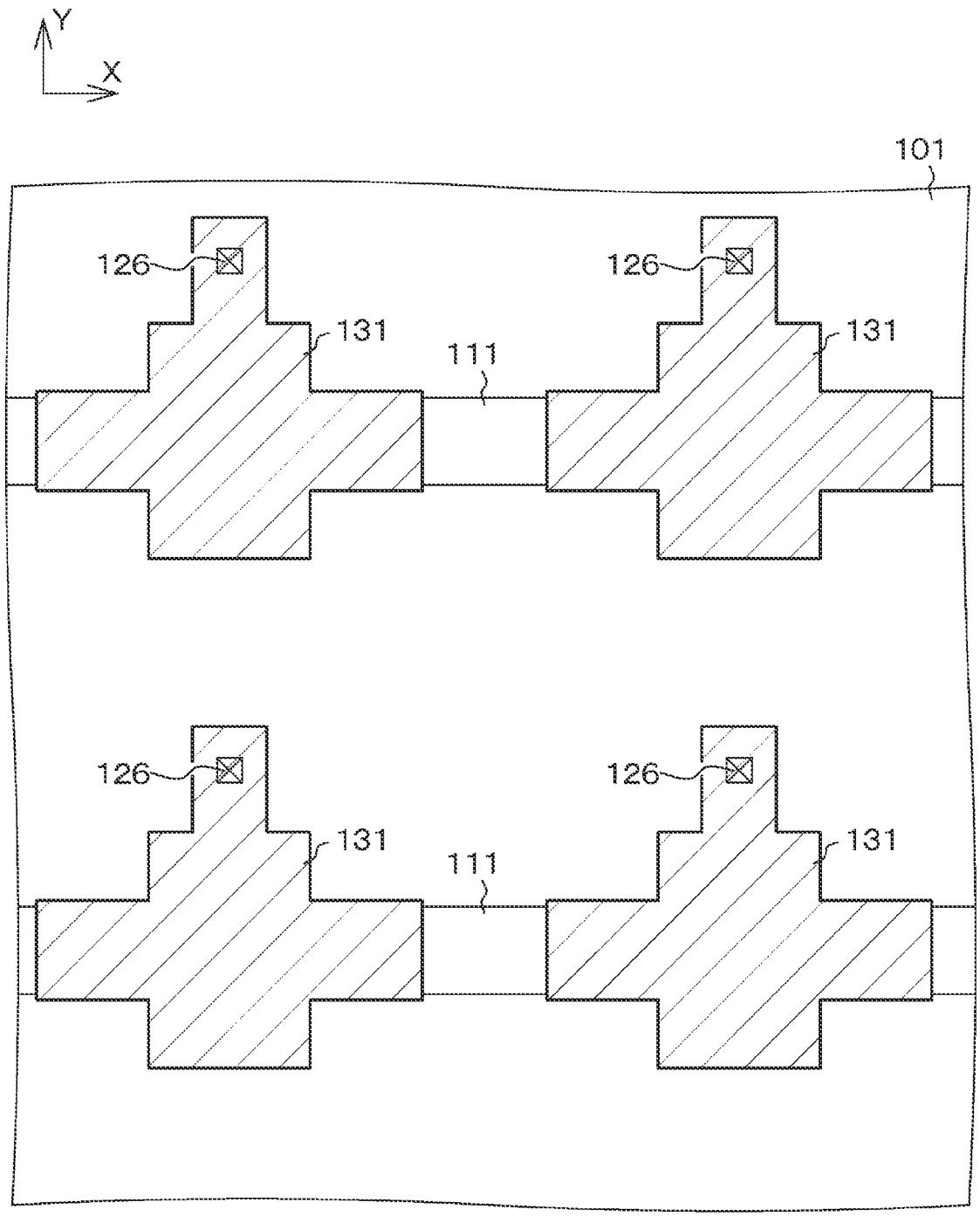
FIG. 16 is a schematic partial plan view of a base or the like for explaining a manufacturing method of a liquid crystal display device according to the first embodiment, subsequent to FIG. 15.

In FIG. 16, hatched portions indicate planar shapes of the light shielding film 131 and the contact 126. As is clear from comparison between FIG. 15 and FIG. 16, the light shielding film 131 is formed so as to cover the upper side of the thin film transistor TR.

Figure 17:
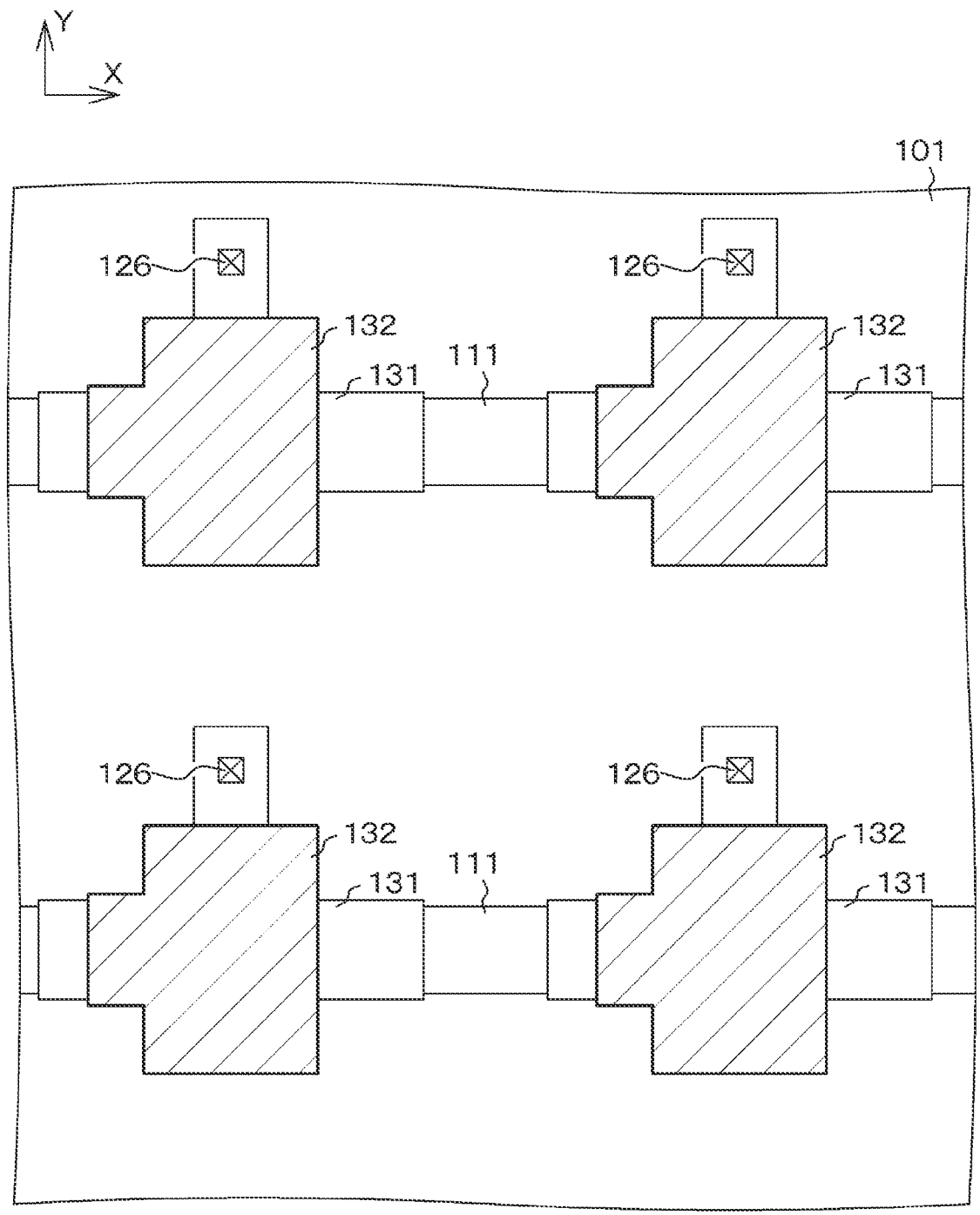
FIG. 17 is a schematic partial plan view of a base or the like for explaining a manufacturing method of a liquid crystal display device according to the first embodiment, subsequent to FIG. 16.

As illustrated in FIGS. 8 and 9, an electrode 132 is formed above the light shielding film 131. As will be described later, a common potential is applied to the electrode 132 from a common potential line, and functions as an electrode of the capacitor CS. In FIG. 17, hatched portions indicate planar shapes of the electrodes 132.

Figure 18:
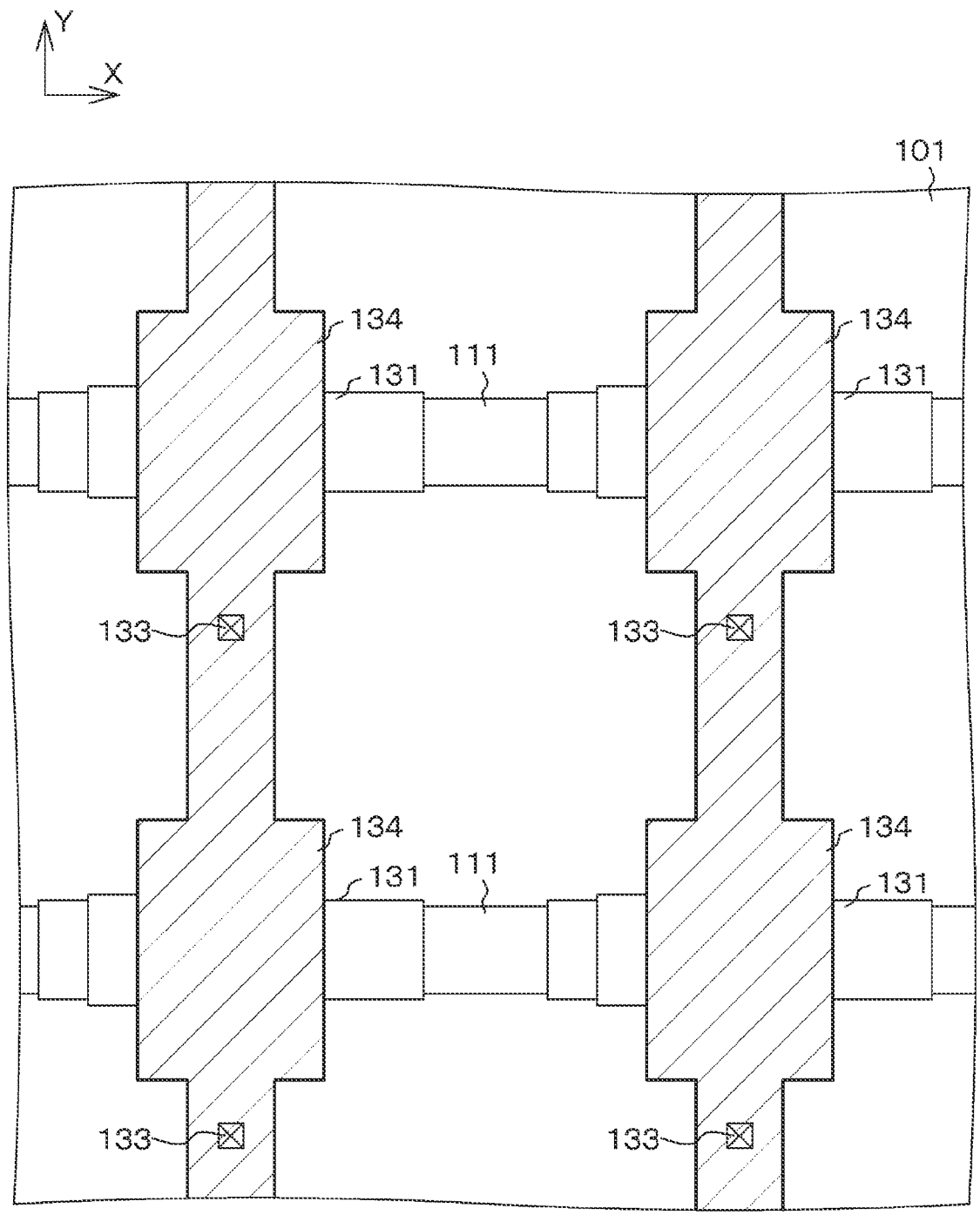
FIG. 18 is a schematic partial plan view of a base or the like for explaining a manufacturing method of a liquid crystal display device according to the first embodiment, subsequent to FIG. 17.

As illustrated in FIGS. 8 and 9, a signal line 134 (corresponding to DTL in FIG. 1) extending in a Y direction in the drawings is formed above the electrode 132. As illustrated in FIG. 9, the wiring layer 130, the insulating film 125, and the gate insulating film 122 are provided with an opening through which the semiconductor material layer 121 is exposed, and a contact 133 is formed in this portion. The signal line 134 is electrically connected to one source/drain region of the thin film transistor TR via the contact 133. In FIG. 18, hatched portions indicate planar shapes of the signal line 134 and the contact 133.

Figure 19:
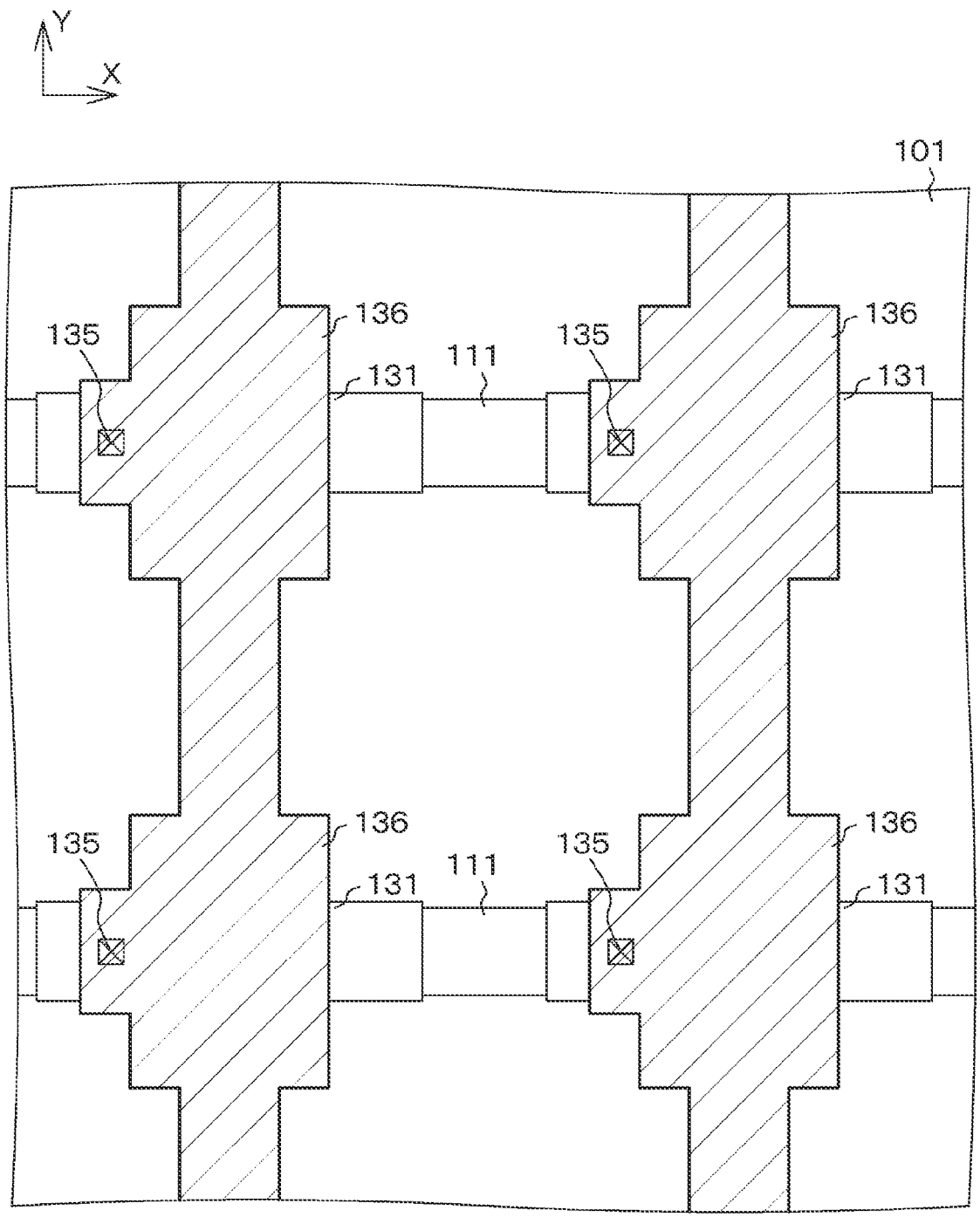
FIG. 19 is a schematic partial plan view of a base or the like for explaining a manufacturing method of a liquid crystal display device according to the first embodiment, subsequent to FIG. 18.

As illustrated in FIGS. 8 and 9, a common potential line 136 extending in the Y direction in the drawings is formed above the signal line 134. As illustrated in FIG. 8, the wiring layer 130 is provided with an opening through which the electrode 132 is exposed, and a contact 135 is formed in this portion. The common potential line 136 is electrically connected to the electrode 132 via the contact 135. The capacitor CS is formed by the electrode 132 and the light shielding film 131. In FIG. 19, hatched portions indicate planar shapes of the common potential line 136 and the contact 135.

Figure 20:
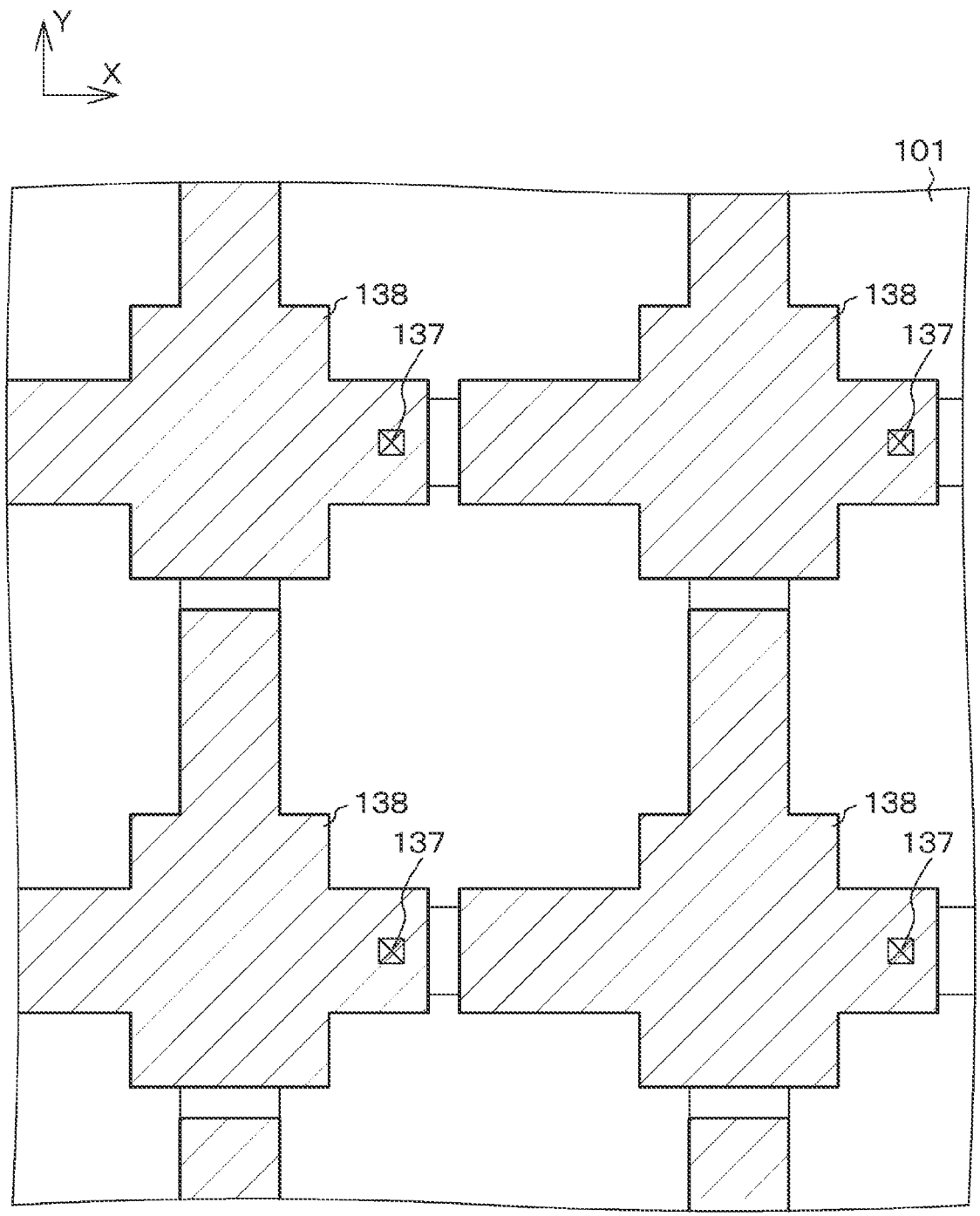
FIG. 20 is a schematic partial plan view of a base or the like for explaining a manufacturing method of a liquid crystal display device according to the first embodiment, subsequent to FIG. 19.

As illustrated in FIGS. 8 and 9, a relay electrode 138 is formed above the common potential line 136. As illustrated in FIG. 8, the wiring layer 130 is provided with an opening through which the light shielding film 131 is exposed, and a contact 137 is formed in this portion. The relay electrode 138 is electrically connected to the light shielding film 131 via the contact 137. In FIG. 20, hatched portions indicate planar shapes of the relay electrode 138 and the contact 137.

Figure 21:
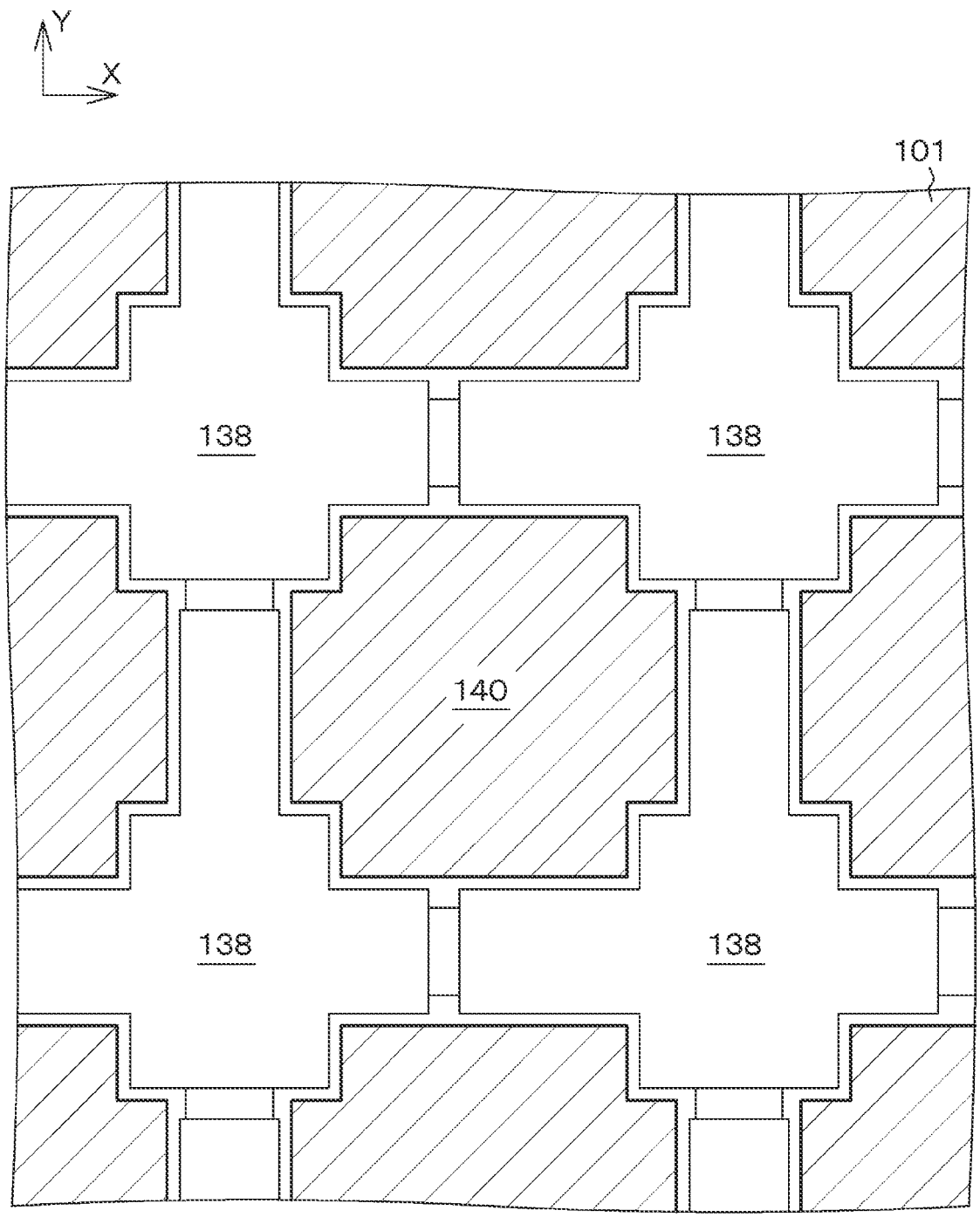
FIG. 21 is a schematic partial plan view of a base or the like for explaining a manufacturing method of a liquid crystal display device according to the first embodiment, subsequent to FIG. 20.
Figure 22A:
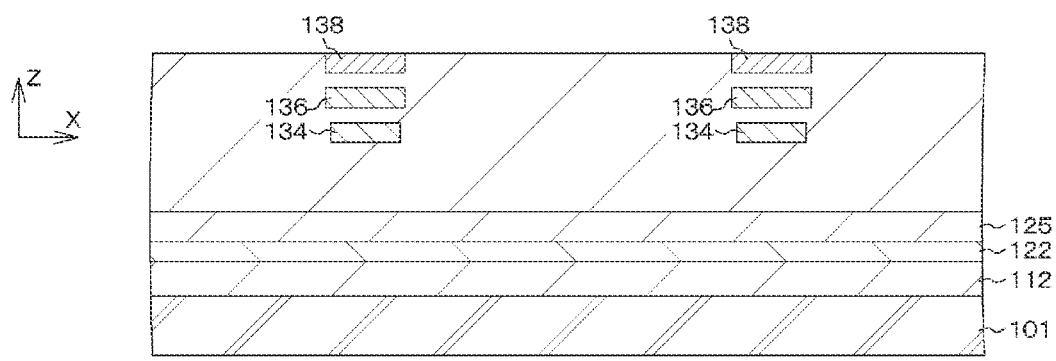
FIGS. 22A and 22B are schematic partial cross-sectional views of a base or the like for explaining a step of forming the light guide illustrated in FIG. 21.
Figure 22B:
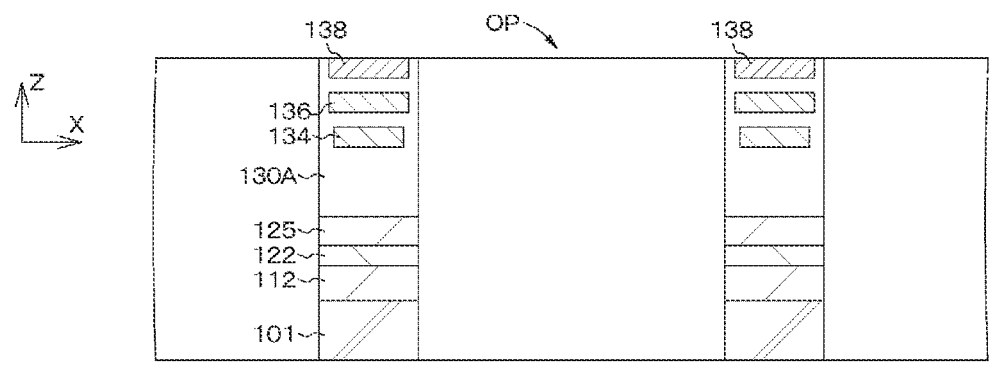

The light shielding region SHA illustrated in FIG. 3 is formed by the above-described various wirings, electrodes, and the like. The light guide LG illustrated in FIG. 7 is formed in a region not overlapping the light shielding region SHA. The light guide LG includes a light-transmissive material 140 extending in a normal direction (Z direction on the drawing) with respect to the support base 101 and disposed such that the wall surface of the light guide LG is in contact with a material having a relatively low refractive index. For example, the light-transmissive material 140 includes silicon oxynitride, and is embedded such that the wall surface of the light-transmissive material 140 is in contact with silicon oxide having a relatively low refractive index. Therefore, light incident on the wall surface of the light-transmissive material 140 beyond a critical angle is totally reflected. The light-transmissive material 140 is formed by carving the support base 101 and the wiring layer 130, and is formed such that the end surface is substantially flush with the surface of the relay electrode 138. In FIG. 21, hatched regions indicate regions in which the light-transmissive material 140 is disposed.

Figure 26:
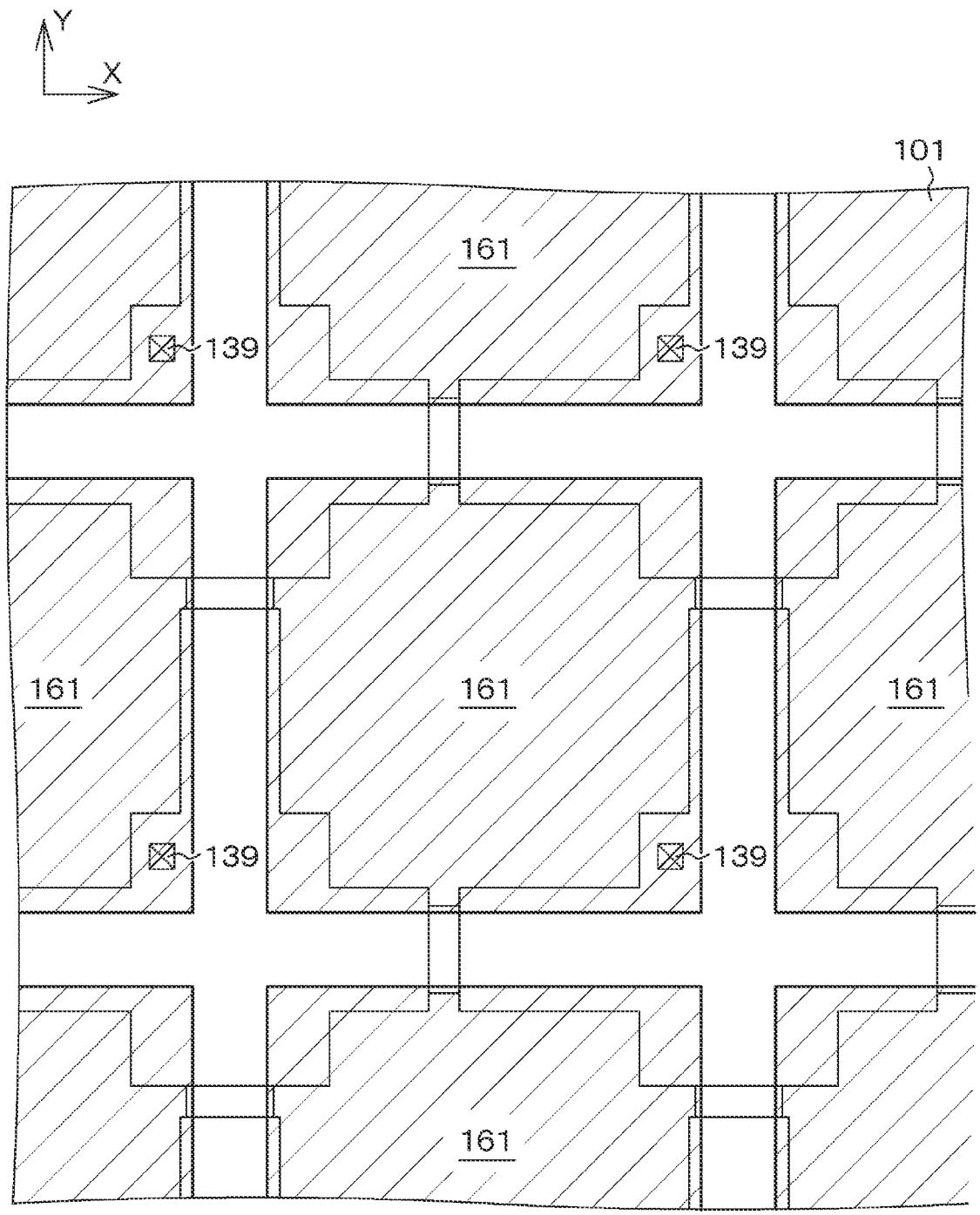
FIG. 26 is a schematic partial plan view of a base or the like for explaining a manufacturing method of a liquid crystal display device according to the first embodiment, subsequent to FIG. 24.

As illustrated in FIGS. 8 and 9, an insulating film as a surface layer of the wiring layer 130 is formed on the entire surface including an upper side of the relay electrode 138. The transparent pixel electrode 161 formed by dividing a transparent conductive material film into a two-dimensional matrix at a predetermined pitch is formed on the insulating film. A reference numeral 139 in FIG. 8 denotes a contact between the transparent pixel electrode 161 and the relay electrode 138. The pixel voltage held by the capacitor CS is supplied to the transparent pixel electrode 161 via a contact 139. In FIG. 26, hatched portions indicate planar shapes of the transparent pixel electrode 161 and the contact 139. Then, a planarization film 162 is formed on the entire surface including an upper side of the transparent pixel electrode 161, and an alignment film 163 is formed on the planarization film 162.

Figure 24:
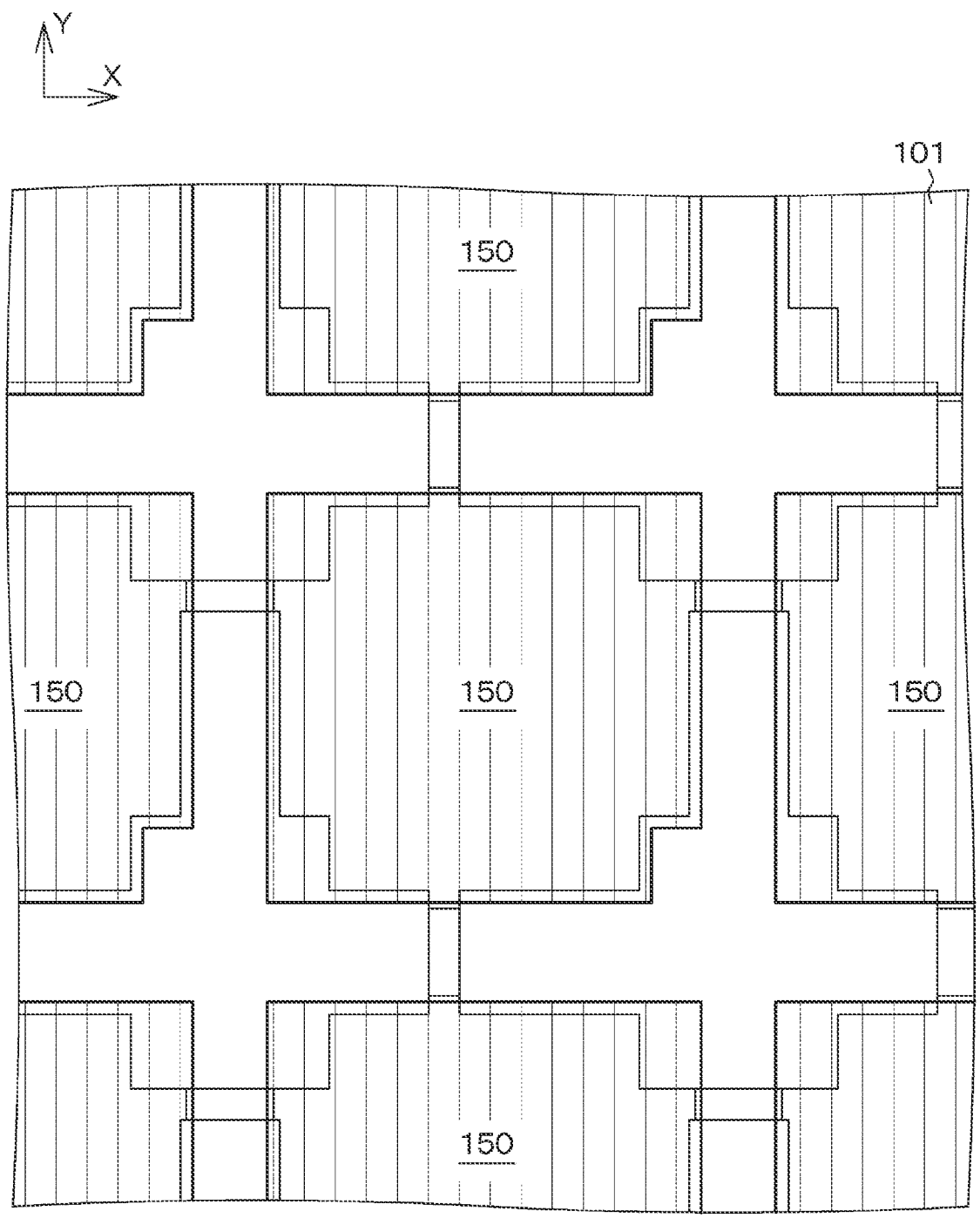
FIG. 24 is a schematic partial plan view of a base or the like for explaining a manufacturing method of a liquid crystal display device according to the first embodiment, subsequent to FIG. 21.

Furthermore, as illustrated in FIG. 7, the polarizer 150 is disposed between the transparent pixel electrode 161 and the light guide LG. The polarizer 150 includes a wire grid polarizer. The wire grid polarizer is configured by arranging a large number of nano-order metal wires in parallel, and transmits an electric field vector perpendicular to the metal wires and reflects an electric field vector parallel to the metal wires. Therefore, since the wire grid polarizer does not absorb light, the wire grid polarizer also has excellent heat resistance. In FIG. 24, hatched regions indicate regions in which the polarizer 150 is disposed.

From the viewpoint of an image quality to be displayed, a ratio between a transmittance of the polarizer 150 in a transmission direction and a transmittance in a direction orthogonal to the transmission direction (so-called extinction ratio) is preferably $3 \times 10^3$ or greater with respect to light having a wavelength of 550 nanometers. Note that in the example illustrated in the drawing, the polarizer 150 is electrically floating, but the present disclosure is not limited thereto. A predetermined voltage may be applied to the polarizer 150. For example, a necessary contact may be appropriately formed, and the voltage of the common potential line 136 may be applied to the polarizer 150, or the same voltage as the voltage applied to the transparent pixel electrode 161 may be applied by making the polarizer 150 and the relay electrode 138 conductive.

As illustrated in FIGS. 7 to 9, the counter substrate 180 disposed to be opposed to the electrooptic substrate 100 includes, for example, a rectangular base 181 including quartz glass, a counter electrode 182 provided on a surface on the liquid crystal material layer 170 side, and an alignment film 183 provided on the counter electrode 182, and further includes a polarizer 184 disposed on the base 181. The polarizer 184 and the polarizer 150 provided in the electrooptic substrate 100 are disposed in a state in which polarization axes are orthogonal to each other (crossed Nicols). The configuration of the polarizer 184 is not particularly limited, and may be an absorption type polarizer or a wire grid polarizer. In a case where heat resistance is required, the polarizer 184 is preferably a wire grid polarizer.

The liquid crystal material layer 170 is sandwiched between the alignment film 163 of the electrooptic substrate 100 and the alignment film 183 of the counter substrate 180. The alignment state of liquid crystal molecules 171 in the absence of electric field is defined by the alignment films 163 and 183. The liquid crystal display device 1 is, for example, a vertical alignment (VA) type liquid crystal display device.

As described above, the structure of the liquid crystal display device 1 has been described in detail. Here, in order to help understanding of the present disclosure, a configuration of a liquid crystal display device of a reference example and a problem thereof will be described.

Figure 10:
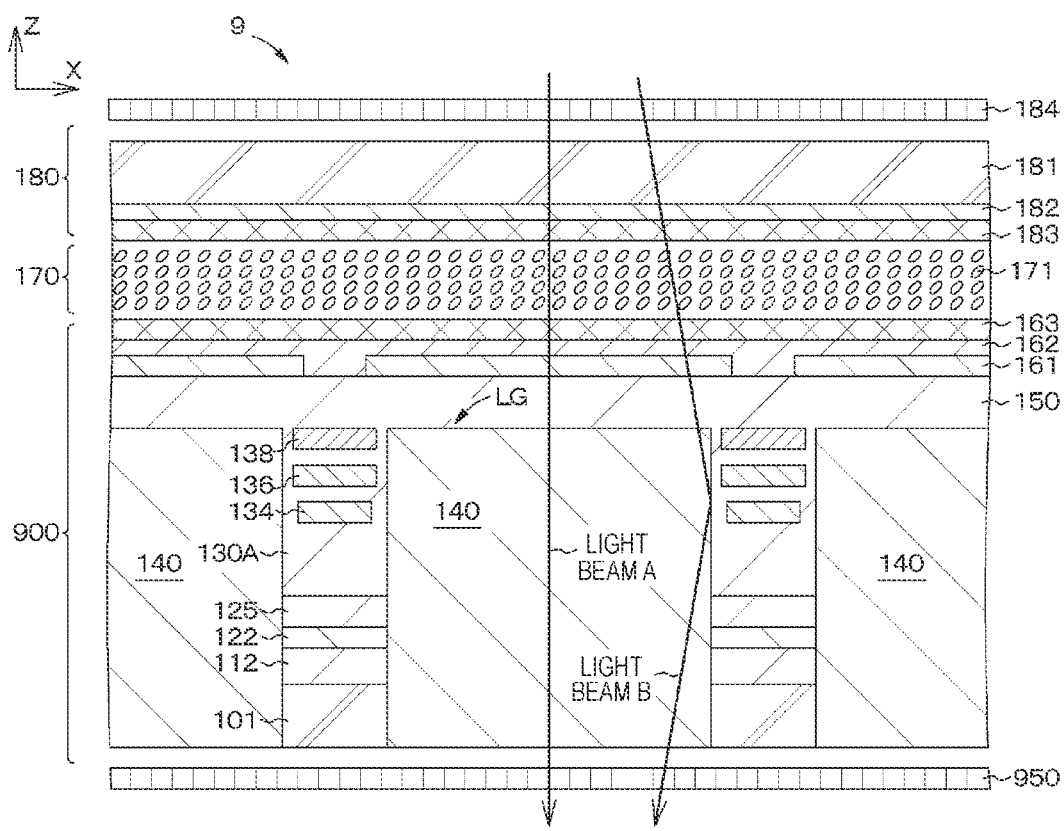
FIG. 10 is a schematic partial cross-sectional view for explaining a shape of light incident on a liquid crystal display device of a reference example.

FIG. 10 is a schematic partial cross-sectional view for explaining a shape of light incident on the liquid crystal display device of the reference example.

A liquid crystal display device 9 of the reference example has a configuration in which the polarizer 150 of the liquid crystal display device 1 is omitted and a polarizer 950 is disposed on the back surface of the support base 101. The polarizer 950 and the polarizer 184 are disposed in a crossed Nicols state. Light incident on the liquid crystal display device 9 from a light source unit (not illustrated) is not completely parallel light, and has an angle in a range of, for example, about ±10 degrees. There are a case where the light incident on the counter substrate 180 passes through the light guide LG as it is (light beam A illustrated in FIG. 10) and a case where the light passes through after being totally reflected by the wall surface of light guide LG (light beam B illustrated in FIG. 10).

In the light reflected at the interface or the like, a phase shift called a Goos-Hänchen shift occurs. Therefore, a phase difference is generated between the light beam A passing through a waveguide without being reflected and the light beam B passing through the waveguide after being reflected at the interface or the like.

Figure 11:
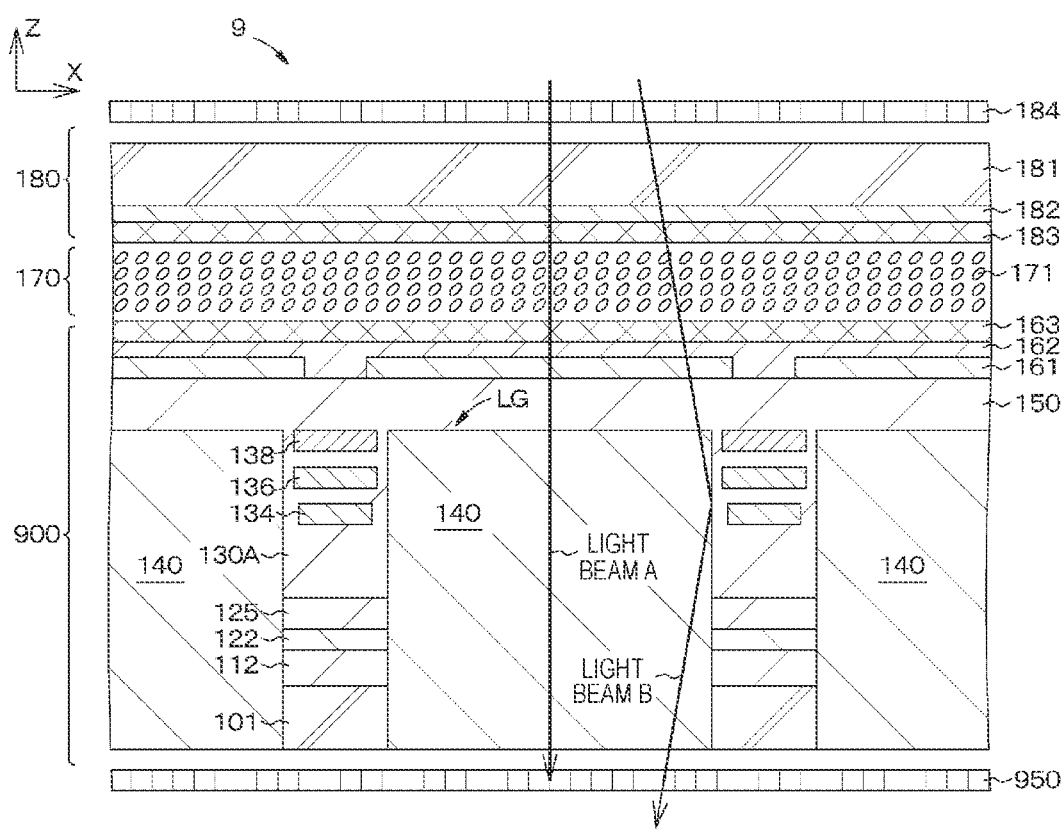
FIG. 11 is a schematic partial cross-sectional view for explaining a shape of light passing through a light guide when a liquid crystal display device of a reference example is in a black display state.

FIG. 11 is a schematic partial cross-sectional view for explaining a shape of the light passing through the light guide when the liquid crystal display device of the reference example is in a black display state.

When the liquid crystal display device 9 is in the black display state, the liquid crystal material layer 170 does not generate a phase difference with respect to the transmitted light. Since the polarizer 184 and the polarizer 950 are in the crossed Nicols state, as the black display state, it is desirable that neither the light beam A nor the light beam B passing through the light guide LG pass through the polarizer 950. However, the phase of the light beam B changes with respect to the light beam A due to the phase shift caused by the reflection. Therefore, a part of the light beam B is transmitted through the polarizer 950. These cause a decrease in contrast of the displayed image. Furthermore, the change in a phase of the light beam B with respect to the light beam A causes a shift with respect to the originally intended luminance even when the liquid crystal display device 9 is in a half tone display state. A decrease in contrast or occurrence of a shift with respect to the originally intended luminance is a cause of impairing the quality of the displayed image.

As described above, the configuration of the liquid crystal display device of the reference example and the problem thereof have been described. In view of the above problem, in the liquid crystal display device 1 of the present disclosure, the polarizer 150 is disposed between the transparent pixel electrode 161 and the light guide LG.

Figure 12:
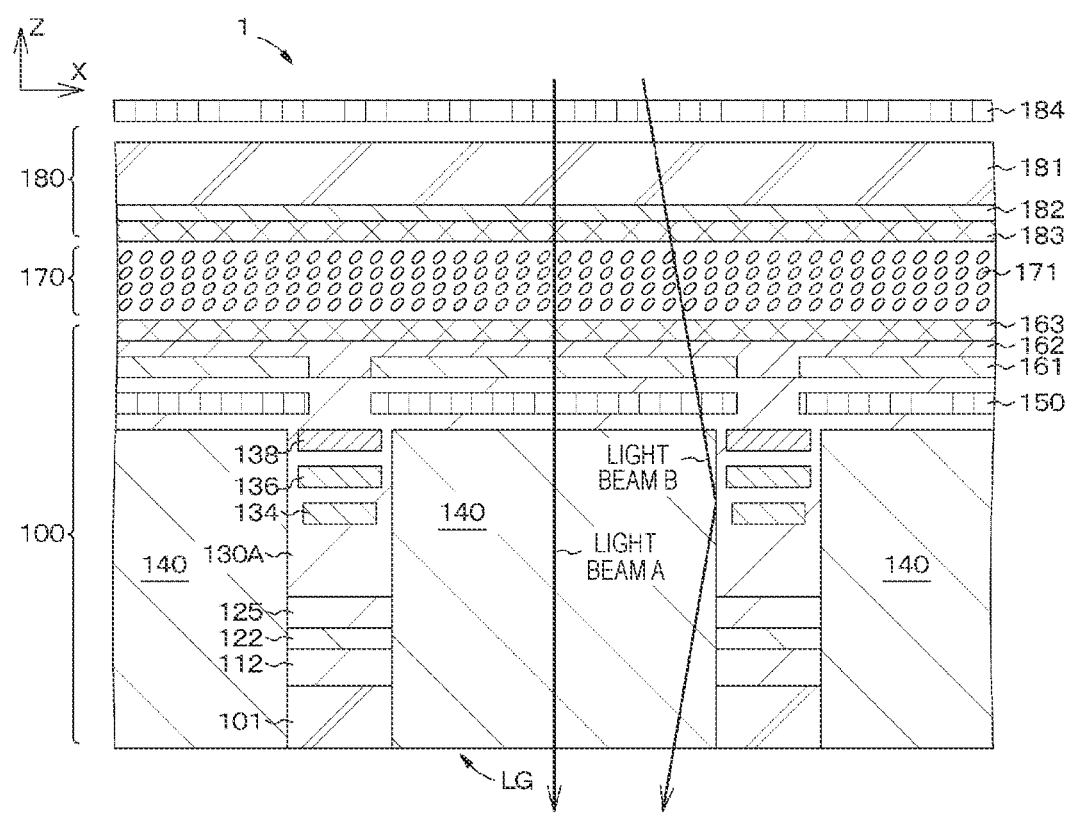
FIG. 12 is a schematic partial cross-sectional view for explaining a shape of light incident on a liquid crystal display device according to the first embodiment.

FIG. 12 is a schematic partial cross-sectional view for explaining a shape of light incident on the liquid crystal display device according to the first embodiment.

According to this configuration, the light incident on the counter substrate 180 reaches the light guide LG after passing through the polarizer 150. Therefore, when the liquid crystal display device 1 is in the black display state, neither the light beam A nor the light beam B transmits through the polarizer 150. Therefore, unlike the liquid crystal display device 9, the intended black display state can be obtained. Furthermore, in a case where the liquid crystal display device 1 is in the white display state, both the light beam A and the light beam B transmit through the polarizer 150 and reach the light guide LG. Then, the phase shift of the light beam B occurs, but this does not affect the display state. As described above, in the display device 1, the phase shift of the light reflected at the interface or the like does not affect the display state.

Furthermore, since most of the light incident on the wall surface in the light guide LG is totally reflected, stray light incident on the transistor can be reduced. This can reduce the leakage current of the transistor.

Next, a manufacturing method of the liquid crystal display device 1 will be described.

FIGS. 13, 14, 15, 16, 17, 18, 19, 20, 21, 22A, 22B, 23A, 23B, 24, 25A, 25B, 25C, 25D, 25E, 25E, and 26 are various drawings for explaining the manufacturing method of the liquid crystal display device 1. Note that FIGS. 13 to 21, 24, and 26 are schematic plan views, but illustration of an insulating layer and an insulating film is omitted in these drawings from the viewpoint of readability. Hereinafter, the manufacturing method of the liquid crystal display device 1 will be described in detail.

[Step-100] (see FIGS. 8, 9, 13, 14, and 15)

First, a scanning line is formed on the support base The support base 101 is prepared, and the scanning lines 111 are formed on the support base 101 by a known film forming method or patterning method (see FIG. 13). The scanning line 111 includes, for example, a metal material such as tungsten (W) or Al—Cu. The same applies to other wirings and electrodes to be described later.

Next, the thin film transistor TR is formed above the scanning line 111. The insulating film 112 including, for example, silicon oxide is formed on the entire surface including an upper side of the scanning line 111, and the semiconductor material layer 121 constituting the thin film transistor TR is formed on the insulating film 112 by a known film forming method or patterning method (see FIG. 14).

Thereafter, the gate insulating film 122 including, for example, silicon oxide is formed on the entire surface including an upper side of the semiconductor material layer 121. Next, an opening is provided in the gate insulating film 122 and the insulating film 112 in a portion corresponding to the contact 123. Thereafter, a conductive material is embedded in the opening to form the contact 123, and then the gate electrode 124 is formed by a known film forming method or patterning method (see FIG. 15). According to this, the thin film transistor TR is formed above the scanning line 111. Next, the insulating film 125 including, for example, silicon oxide is formed on the entire surface including an upper side of the gate electrode 124.

[Step-110] (see FIGS. 8, 9, 16, and 17)

Thereafter, the light shielding film 131 is formed above the thin film transistor TR. First, an opening through which the semiconductor material layer 121 is exposed is provided in the insulating film 125 or the like at a portion corresponding to the contact 126. Next, a conductive material is embedded in the opening to form the contact 126, and then the light shielding film 131 is formed by a known film forming method or patterning method (see FIG. 16). The light shielding film 131 is connected to the semiconductor material layer 121 via the contact 126 (see FIG. 9).

Next, the electrode 132 constituting the capacitor CS is formed above the light shielding film 131. An insulating film including, for example, silicon oxide is formed on the entire surface including an upper side of the light shielding film 131, and then the electrode 132 is formed on the insulating film by a known film forming method or patterning method (see FIG. 17).

[Step-120] (see FIGS. 8, 9, 18, and 19)

Next, the signal line 134 is formed above the electrode 132. An insulating layer including, for example, silicon oxide is formed on the entire surface including an upper side of the electrode 132, and then an opening through which the semiconductor material layer 121 is exposed is provided in a portion corresponding to the contact 133. Next, a conductive material is embedded in the opening to form the contact 133, and then the signal line 134 is formed by a known film forming method or patterning method (see FIG. 18). The signal line 134 is connected to the semiconductor material layer 121 via the contact 133 (see FIG. 9).

Next, the common potential line 136 is formed above the signal line 134. An insulating layer including, for example, silicon oxide is formed on the entire surface including an upper side of the signal line 134, and then an opening through which the electrode 132 is exposed is provided in a portion corresponding to the contact 135. Next, a conductive material is embedded in the opening to form the contact 135, and then the common potential line 136 is formed by a known film forming method or patterning method (see FIG. 19). The common potential line 136 is connected to the electrode 132 via the contact 135 (see FIG. 8).

[Step-130] (see FIGS. 8, 9, and 20)

Next, the relay electrode 138 is formed above the common potential line 136. An insulating layer including, for example, silicon oxide is formed on the entire surface including an upper side of the common potential line 136, and then an opening through which the light shielding film 131 is exposed is provided in a portion corresponding to the contact 137. Next, a conductive material is embedded in the opening to form the contact 137, and then the relay electrode 138 is formed by a known film forming method or patterning method (see FIG. 20). The relay electrode 138 is connected to the light shielding film 131 via the contact 137 (see FIG. 8).

[Step-140] (see FIGS. 7, 21, 22A, 22B, 23A, and 23B)

Next, the light guide LG is formed. After an insulating layer including, for example, silicon oxide is formed on the entire surface including and upper side of the relay electrode 138, for example, planarization is performed such that the relay electrode 138 is exposed (see FIG. 22A). Next, an opening OP is provided in a portion to be filled with the light-transmissive material 140 illustrated in FIG. 21 (see FIG. 22B).

Figure 23A:
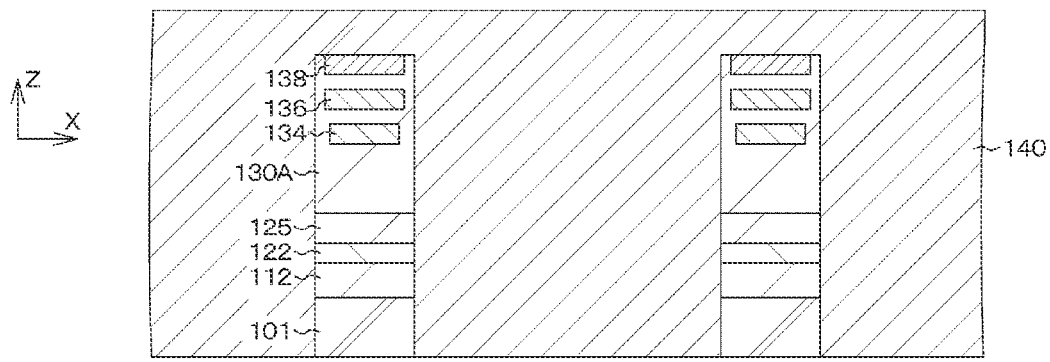
FIGS. 23A and 23B are schematic partial cross-sectional views of a base or the like for explaining a step of forming the light guide illustrated in FIG. 21, subsequent to FIG. 22B.
Figure 23B:
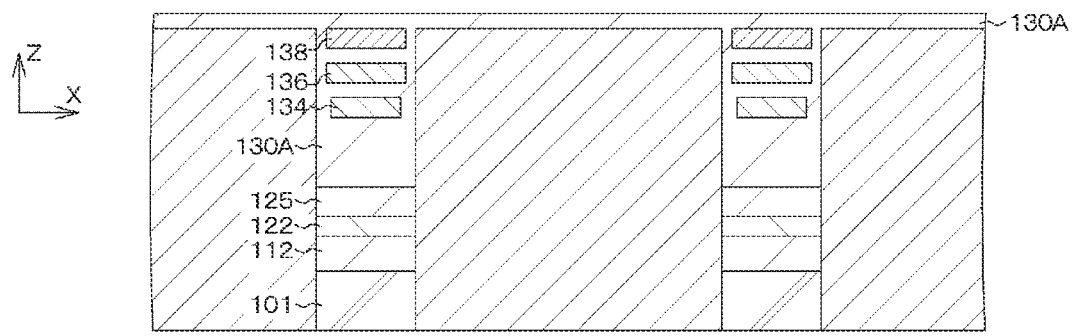

Thereafter, for example, a silicon oxynitride film is formed on the entire surface as the light-transmissive material 140 to fill the inside of the opening OP (see FIG. 23A). Next, for example, planarization is performed such that the relay electrode 138 is exposed. Thereafter, an insulating film 130A including, for example, silicon oxide is formed on the entire surface (see FIG. 23B). The light guide LG can be obtained by the above steps.

[Step-150] (see FIGS. 7, 24, 25A, 25B, 25C, 25D, 25E, and 25F)

Next, the polarizer 150 is formed above the light guide LG.

Figure 25A:
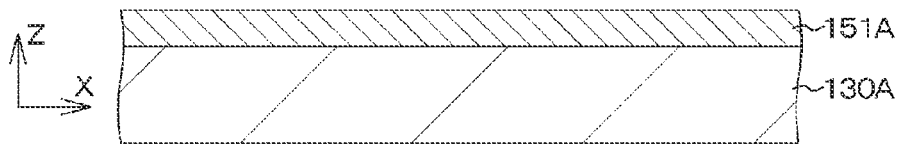
FIGS. 25A, 25B, 25C, 25D, 25E, and 25F are schematic partial cross-sectional views of a base or the like for explaining a step of forming the polarizer illustrated in FIG. 24.
Figure 25B:
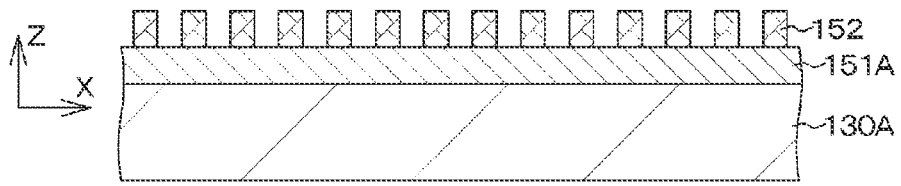

First, a metal film 151A including, for example, aluminum (Al) is formed on the insulating film 130A (see FIG. 25A). Thereafter, a resist is patterned on the metal film 151A to form a mask 152 (see FIG. 25B).

Figure 25C:
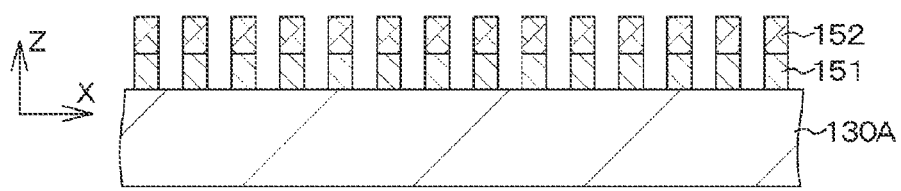
Figure 25D:
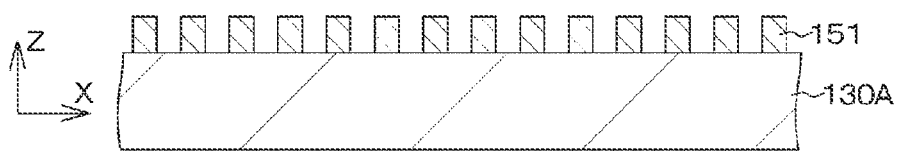

Next, the metal film 151A is patterned using, for example, a dry etching method, and a large number of nano-order metal wires 151 are disposed in parallel in a region indicated by a reference numeral 150 in FIG. 24 (see FIG. 25C).

Figure 25E:
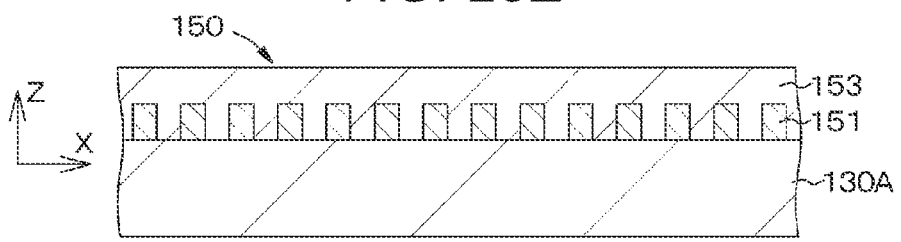
Figure 25F:
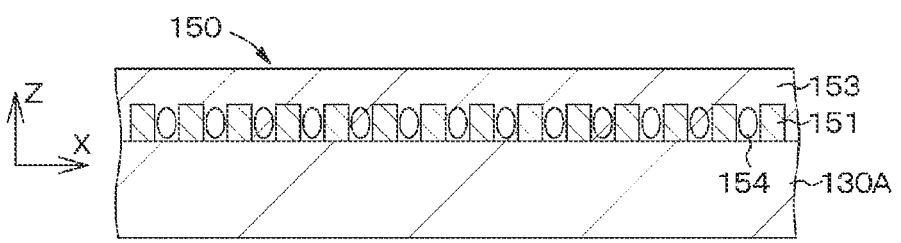

Thereafter, the mask 152 is removed (FIG. 25D), and then, a protective film 153 including, for example, silicon oxide is formed (FIG. 25E). The polarizer 150 can be obtained by the above steps. Note that the extinction ratio of the wire grid polarizer increases as the refractive index of the substance between the wire grids decreases. Therefore, for example, as illustrated in FIG. 25F, the protective film 153 may be formed such that voids 154 are generated between the metal wires 151.

[Step-160] (see FIGS. 7, 8, 9, and 26)

Thereafter, the transparent pixel electrode 161 is formed above the polarizer 150. An insulating layer including, for example, silicon oxide is formed on the entire surface including an upper side of the polarizer 150, and then an opening through which the relay electrode 138 is exposed is provided in a portion corresponding to the contact 139. Next, a conductive material is embedded in the opening to form the contact 138, and then the transparent pixel electrode 161 is formed by a known film forming method or patterning method (see FIG. 26). The transparent pixel electrode 161 is connected to the light shielding film 131 constituting an electrode of the capacitor CS via the contact 139, the relay electrode 138, and the contact 137.

Next, the planarization film 162 including, for example, silicon oxide is formed on the entire surface including an upper side of the transparent pixel electrode 161, and then the alignment film 163 is further formed. The electrooptic substrate 100 used for the liquid crystal display device 1 can be obtained by the above steps.

[Step-170]

Next, for example, the counter substrate 180 is prepared, the counter substrate 180 including the rectangular base 181 including quartz glass, the counter electrode 182 provided on one surface of the base 181, and the alignment film 183 provided on the counter electrode 182. Then, the electrooptic substrate 100 and the counter substrate 180 are opposed to each other with the liquid crystal material layer 170 interposed therebetween, and the periphery thereof is sealed. Thereafter, the polarizer 184 is disposed on the other surface of the base 181, and thus the liquid crystal display device 1 can be obtained.

Second Embodiment

The second embodiment also relates to an electrooptic substrate, a liquid crystal display device, and an electronic apparatus according to present disclosure.

Figure 27:
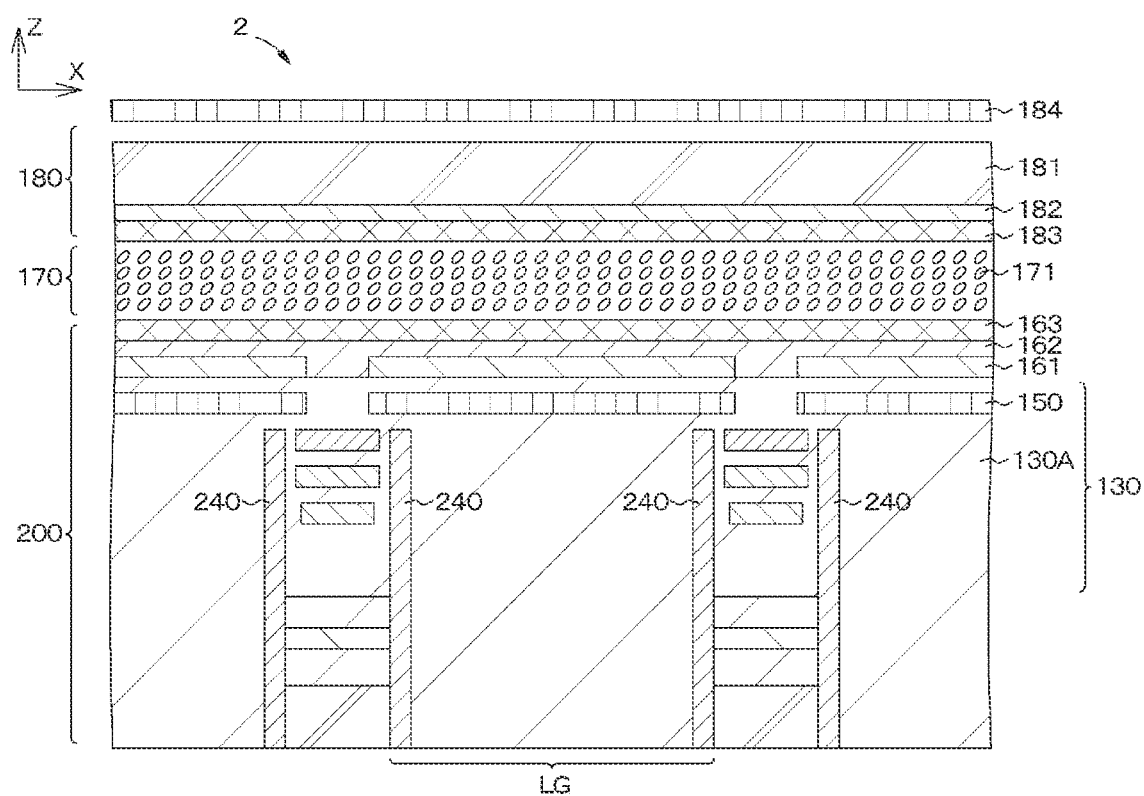
FIG. 27 is a schematic partial cross-sectional view of a liquid crystal display device according to a second embodiment of the present disclosure.

FIG. 27 is a schematic partial cross-sectional view of the liquid crystal display device according to the second embodiment of the present disclosure, and is a view corresponding to FIG. 7 referred to in the first embodiment. A schematic plan view for explaining the liquid crystal display device according to the second embodiment is only required to be obtained by replacing the liquid crystal display device 1 in FIG. 1 with a liquid crystal display device 2.

In the liquid crystal display device 1 according to the first embodiment, the light guide includes a light shielding material that extends in the normal direction with respect to the support base and is disposed so as to surround the wall surface of the light-transmissive material located in a light guide region. On the other hand, the liquid crystal display device 2 according to the second embodiment is different in that the light guide includes a light shielding material that extends in the normal direction with respect to the support base and is disposed so as to surround the wall surface of the light-transmissive material located in a light guide region.

Figure 28:
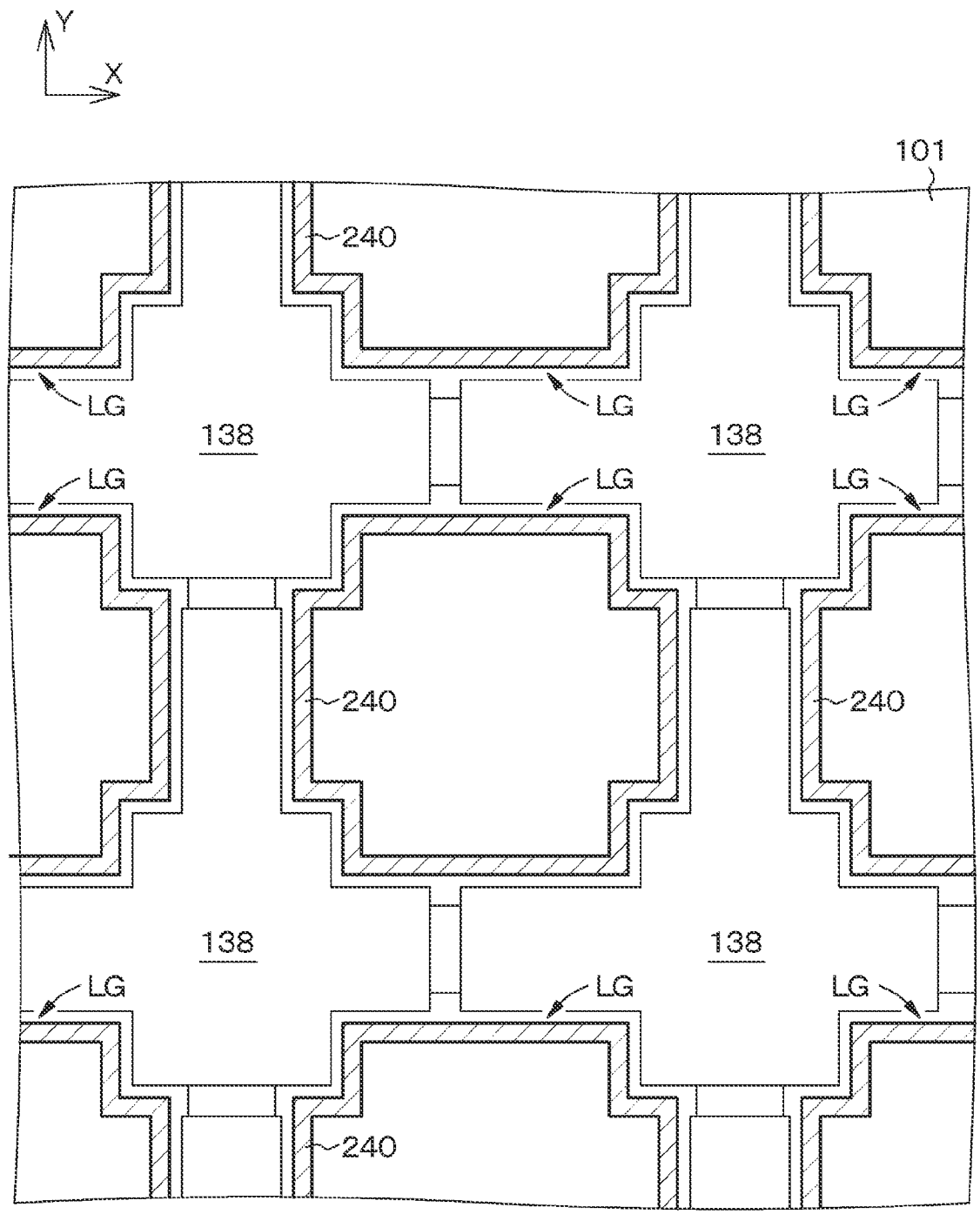
FIG. 28 is a schematic partial plan view of a base or the like for explaining a planar shape of a light guide of a liquid crystal display device according to the second embodiment.

FIG. 28 is a schematic partial plan view of the base or the like for explaining a planar shape of the light guide of the liquid crystal display device according to the second embodiment.

In an electrooptic substrate 200 constituting the liquid crystal display device 2, the light guide LG includes a light shielding material 240 that extends in the normal direction with respect to the support base 101 and is disposed so as to surround the wall surface of the light-transmissive material located in a light guide region. The light shielding material 240 includes, for example, a metal material such as aluminum (Al) or silver (Ag). In FIG. 28, the same material as the material constituting the insulating layer used for the wiring layer 130, for example, a silicon oxide is embedded in a region surrounded by the light shielding material 240.

The light incident on the counter substrate 180 reaches the light guide LG after passing through the polarizer 150. The phase shift of the light reflected by the light shielding material 240 of the light guide LG occurs, but as described with reference to FIG. 12 in the first embodiment, this does not affect the display state.

Furthermore, as is clear from comparison between FIG. 15 and FIG. 28, the thin film transistor TR is located outside the region surrounded by the light shielding material 240. Therefore, stray light incident on the thin film transistor TR can be reduced. This can reduce the leakage current of the thin film transistor TR.

Next, a manufacturing method of the liquid crystal display device 2 will be described.

FIGS. 29A, 29B, 30A, and 30B are various drawings for explaining the manufacturing method of the liquid crystal display device 2.

[Step-200]
First, the steps similar to [Step-100] to [Step-130] described in the first embodiment are performed.
[Step-210] (see FIGS. 28, 29A, 29B, 30A, and 30B)
Next, the light guide LG is formed. After an insulating layer including, for example, silicon oxide is formed on the entire surface including and upper side of the relay electrode 138, for example, planarization is performed such that the relay electrode 138 is exposed. Next, an opening OP is provided such that the wall surface forming the light shielding material 240 illustrated in FIG. 28 is exposed (see FIG. 29A).

Figure 29A:
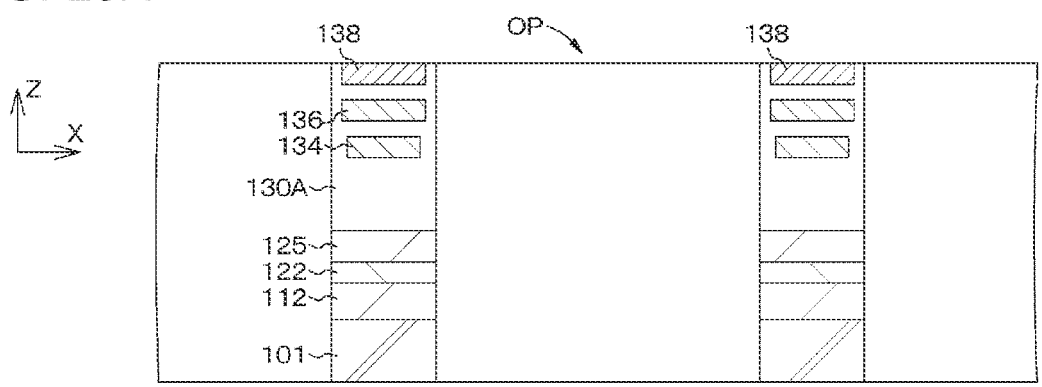
FIGS. 29A and 29B are schematic partial cross-sectional views of a base or the like for explaining a step of forming the light guide illustrated in FIG. 28.
Figure 29B:
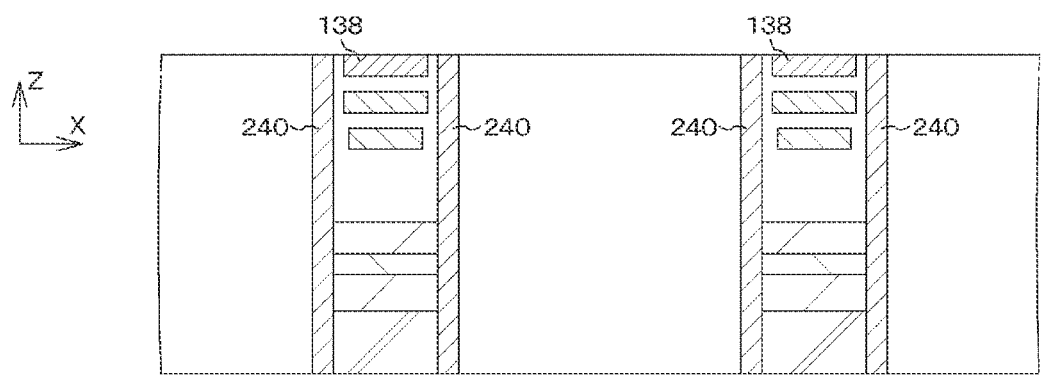
Figure 30A:
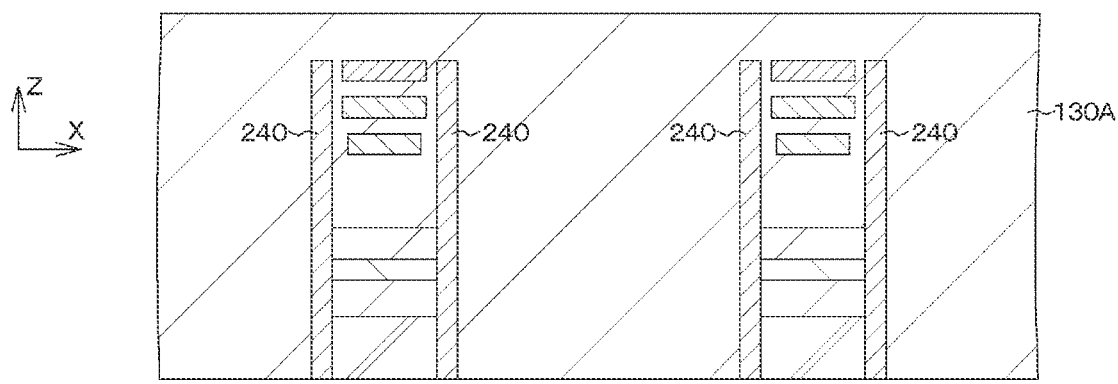
FIGS. 30A and 30B are schematic partial cross-sectional views of a base or the like for explaining a step of forming the light guide illustrated in FIG. 28, subsequent to FIG. 29B.
Figure 30B:
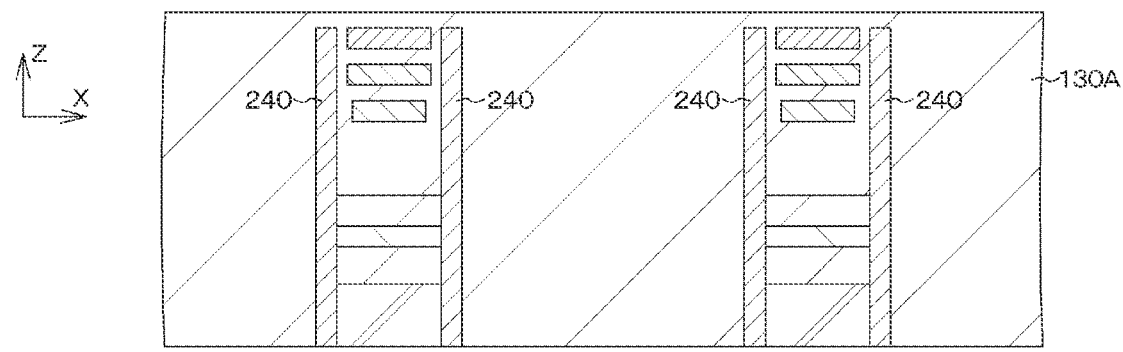

Thereafter, the light shielding material 240 is deposited on the wall surface of the opening OP (see FIG. 29B). Next, the insulating film 130A including, for example, silicon oxide is formed on the entire surface and fills the opening (see FIG. 30A). Thereafter, for example, planarization is performed to an extent that the relay electrode 138 is not exposed (see FIG. 30B). The light guide LG can be obtained by the above steps.
[Step-220]
Next, the steps similar to [Step-150] to [Step-170] described in the first embodiment are performed. The liquid crystal display device 2 can be obtained by the above steps.

Third Embodiment

The third embodiment also relates to an electrooptic substrate, a liquid crystal display device, and an electronic apparatus according to present disclosure.

Figure 31:
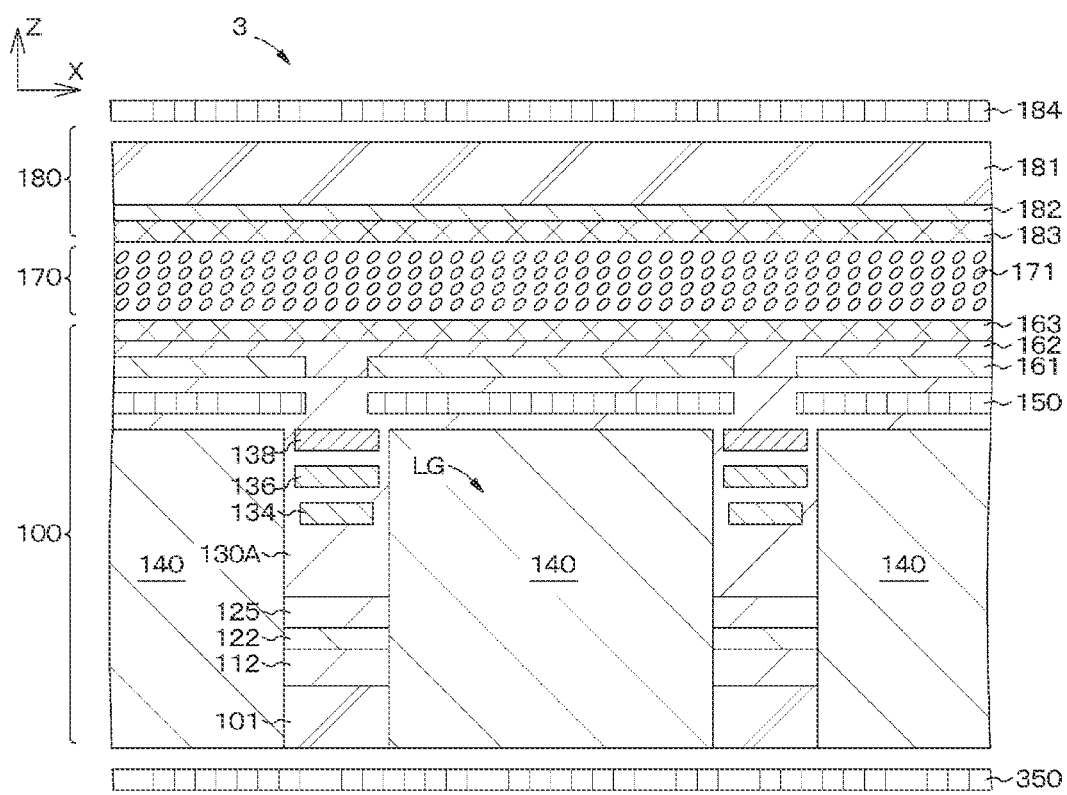
FIG. 31 is a schematic partial cross-sectional view of a liquid crystal display device according to a third embodiment of the present disclosure.

FIG. 31 is a schematic partial cross-sectional view of the liquid crystal display device according to the third embodiment of the present disclosure, and is a view corresponding to FIG. 7 referred to in the first embodiment. A schematic plan view for explaining the liquid crystal display device according to the second embodiment is only required to be obtained by replacing the liquid crystal display device 1 in FIG. 1 with a liquid crystal display device 3.

In the liquid crystal display device 1 according to the first embodiment, the polarizer of the electrooptic substrate 100 is disposed between the transparent pixel electrode and the light guide. On the other hand, the liquid crystal display device 3 according to the third embodiment is different in that another polarizer is further disposed on the back surface side of the support base of the electrooptic substrate. The liquid crystal display device 3 has the configuration similar to that of the liquid crystal display device 1 except for the above-described points.

In a case where a so-called light transmission ratio cannot be sufficiently secured in the polarizer 150 disposed in a cell, the contrast decreases in the displayed image. In such a case, when another polarizer 350 is further disposed on the back surface side of the support base, the extinction ratio is improved, and the contrast can be improved. Note that, also in the liquid crystal display device 2 described in the second embodiment, another polarizer 350 can be further disposed on the back surface side of the support base 101 of the electrooptic substrate 200.

The configuration of the polarizer 350 is not particularly limited, and may be an absorption type polarizer or a wire grid polarizer. In a case where heat resistance is required, the polarizer 350 is preferably a wire grid polarizer.
[Description of Electronic Apparatus]

The liquid crystal display device according to the present disclosure described above can be used as a display unit (display device) of the electronic apparatus in all the fields, the display unit displaying a video signal input to the electronic apparatus or a video signal generated in the electronic apparatus as an image or a video. As an example, it can be used as, for example, a display unit such as a television set, a digital still camera, a laptop personal computer, a mobile terminal device such as a mobile phone, a video camera, a head mounted display (head mounted display), or the like.

An example of the liquid crystal display device of the present disclosure also includes a liquid crystal display device having a module shape with a sealed configuration. As an example, a display module formed by attaching an opposing portion including a transparent glass material or the like to the pixel array unit is applicable. Note that the display module may be provided with a circuit unit for inputting and outputting a signal or the like from the outside to the pixel array unit, a flexible printed circuit (FPC), and the like. Hereinafter, as specific examples of the electronic apparatus using the liquid crystal display device of the present disclosure, a projection-type display device, a digital still camera, and a head mounted display will be exemplified. However, the specific example provided here is merely an example, and the present disclosure is not limited to this.

Specific Example 1

Figure 32:
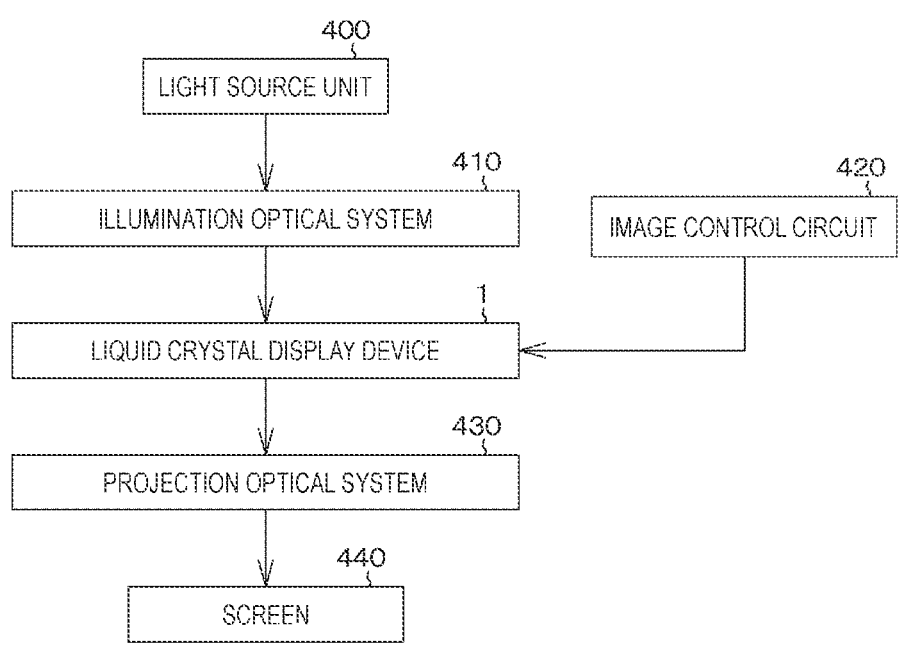
FIG. 32 is a conceptual diagram of a projection-type display device.

FIG. 32 is a conceptual diagram of a projection-type display device using the liquid crystal display device of the present disclosure. The projection-type display device includes a light source unit 400, an illumination optical system 410, a liquid crystal display device 1, an image control circuit 420 that drives the liquid crystal display device, a projection optical system 430, and a screen 440. The light source unit 400 can include, for example, various lamps such as a xenon lamp, and a semiconductor light emitting element such as a light emitting diode. The illumination optical system 410 is used to guide light from the light source unit 400 to the liquid crystal display device 1, and includes optical elements such as a prism and a dichroic mirror. The liquid crystal display device 1 acts as a light valve, and an image is projected on the screen 440 through the projection optical system 430.

Specific Example 2

Figure 33A:
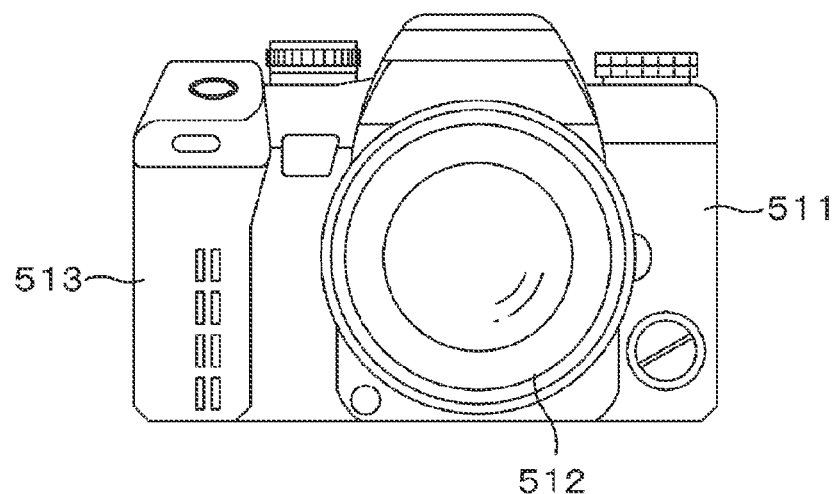
FIGS. 33A and 33B are external views of a single-lens reflex digital still camera with an interchangeable lens.
Figure 33B:
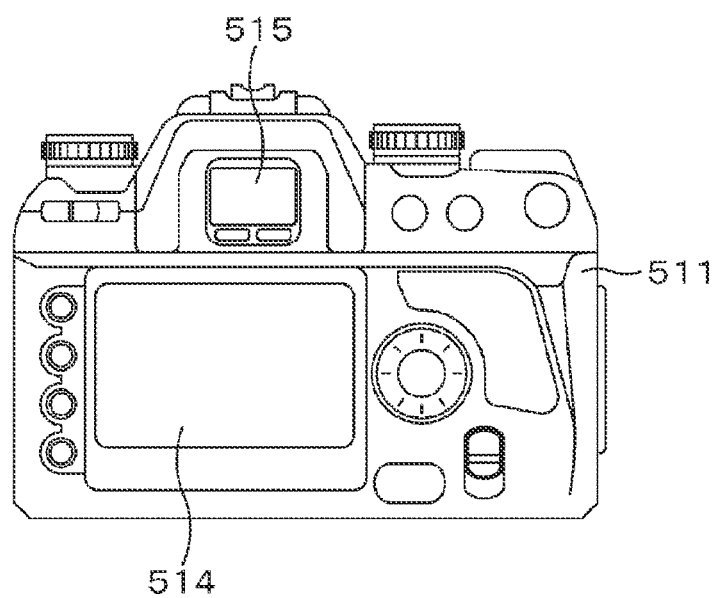

FIG. 33 is an external view of a single-lens reflex digital still camera with an interchangeable lens, FIG. 33A illustrates a front view thereof and FIG. 33B illustrates a rear view thereof. The single-lens reflex digital still camera with an interchangeable lens includes, for example, an interchangeable imaging lens unit (interchangeable lens) 512 on the front right side of a camera body 511, and a grip portion 513 to be held by a photographer on the front left side.

Then, a monitor 514 is provided substantially at the center of the back surface of the camera body 511. A viewfinder (eyepiece window) 515 is provided above the monitor 514. By looking into the viewfinder 515, the photographer can visually recognize the optical image of a subject, which is guided from the imaging lens unit 512 and determine the composition.

In the single-lens reflex digital still camera with an interchangeable lens having the above-described configuration, the liquid crystal display device of the present disclosure can be used as the viewfinder 515. That is, the single-lens reflex digital still camera with an interchangeable lens according to the present example is manufactured by using the liquid crystal display device of the present disclosure as the viewfinder 515.

Specific Example 3

Figure 34:
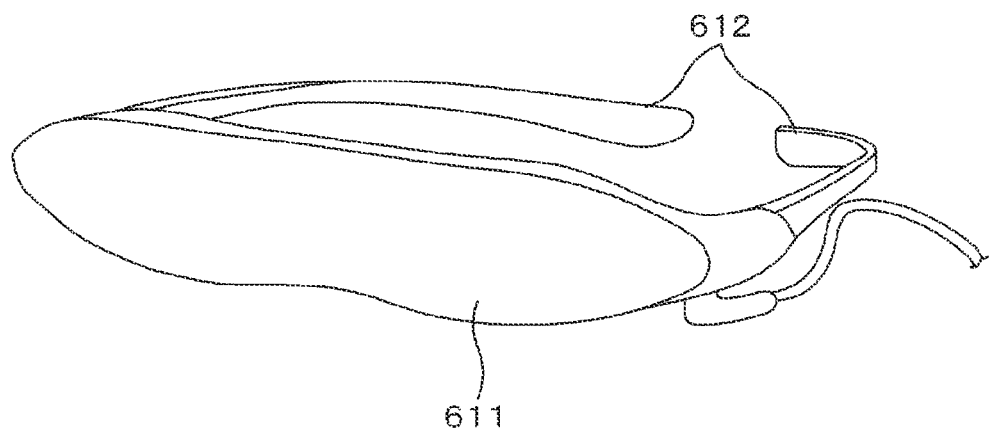
FIG. 34 is an external view of a head mounted display.

FIG. 34 is an external view of a head mounted display. The head mounted display includes, for example, ear hooking portions 612 to be worn on the head of a user on both sides of an eyeglass-type display unit 611. In this head mounted display, the liquid crystal display device of the present disclosure can be used as the display unit 611. That is, the head mounted display according to the present example is manufactured by using the liquid crystal display device of the present disclosure as the display unit 611.

Specific Example 4

Figure 35:
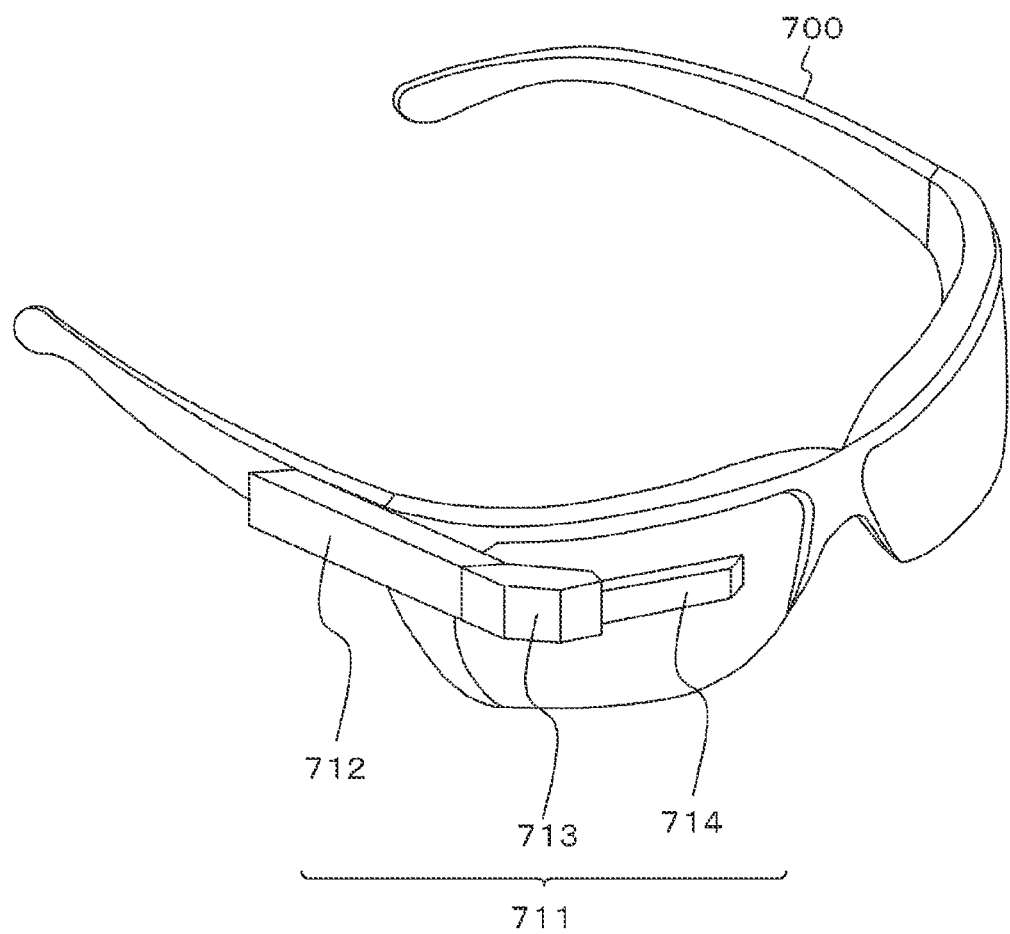
FIG. 35 is an external view of a see-through head mounted display.

FIG. 35 is an external view of a see-through head mounted display. A see-through head mounted display 711 includes a body 712, an arm 713, and a lens barrel 714.

The body 712 is connected to the arm 713 and eyeglasses 700. Specifically, an end portion of the body 712 in a long side direction is coupled to the arm 713, and one side of the side surface of the body 712 is connected to the eyeglasses 700 via a connecting member. Note that the body 712 may be directly mounted on the head of the human body.

The body 712 incorporates a control board for controlling the operation of the see-through head mounted display 711 and a display unit. The arm 713 connects the body 712 with the lens barrel 714 and supports the lens barrel 714. Specifically, the arm 713 is coupled to the end of the body 712 and the end of the lens barrel 714, and fixes the lens barrel 714. Furthermore, the arm 713 incorporates a signal line for communicating data related to an image provided from the body 712 to the lens barrel 714.

The lens barrel 714 projects image light provided from the body 712 via the arm 713 toward the eyes of the user wearing the see-through head mounted display 711 through the eyepiece. In this see-through head mounted display 711, the liquid crystal display device of the present disclosure can be used as the display unit of the body 712.

[Others]

Note that the present disclosure can also have the following configurations.

[A1]

An electrooptic substrate including:
    a support base; and transparent pixel electrodes disposed in a matrix on a front surface side of the support base,
    in which a light guide corresponding to each of the transparent pixel electrodes is provided on a back surface side of the transparent pixel electrode, and
    a polarizer is disposed between the light guide and the transparent pixel electrode.

[A2]

The electrooptic substrate according to [A1], in which the light guide includes a light-transmissive material that extends in a normal direction with respect to the support base and is disposed such that a wall surface of the light guide is in contact with a material having a relatively low refractive index.

[A3]

The electrooptic substrate according to [A1], in which the light guide includes a light shielding material that extends in a normal direction with respect to the support base and is disposed so as to surround a wall surface of a light-transmissive material located in a light guide region.

[A4]

The electrooptic substrate according to [A3],
    in which the light shielding material includes a metal material.

[A5]
The electrooptic substrate according to any one of [A1] to [A4],
in which the polarizer includes a wire grid polarizer.

[A6]
The electrooptic substrate according to [A5],
in which a ratio between a transmittance of the polarizer in a transmission direction and a transmittance in a direction orthogonal to the transmission direction is $3 \times 10^3$ or greater with respect to light having a wavelength of 550 nanometers.

[A7]
The electrooptic substrate according to [A5],
in which the polarizer is electrically floating.

[A8]
The electrooptic substrate according to [A5],
in which a predetermined voltage is applied to the polarizer.

[A9]
The electrooptic substrate according to [A8],
in which a same voltage as a voltage applied to the transparent pixel electrode is applied to the polarizer.

[A10]
The electrooptic substrate according to any one of [A1] to [A9],
in which another polarizer is further disposed on a back surface side of the support base.

[B1]
A liquid crystal display device including:
an electrooptic substrate including a support base and transparent pixel electrodes disposed in a matrix on a front surface side of the support base;
a counter substrate disposed to be opposed to the electrooptic substrate; and
a liquid crystal material layer sealed between the electrooptic substrate and the counter substrate,
in which a light guide corresponding to each of the transparent pixel electrodes is provided on a back surface side of the transparent pixel electrode, and
a polarizer is disposed between the light guide and the transparent pixel electrode.

[B2]
The liquid crystal display device according to [B1],
in which the light guide includes a light-transmissive material that extends in a normal direction with respect to the support base and is disposed such that a wall surface of the light guide is in contact with a material having a relatively low refractive index.

[B3]
The liquid crystal display device according to [B1],
in which the light guide includes a light shielding material that extends in a normal direction with respect to the support base and is disposed so as to surround a wall surface of a light-transmissive material located in a light guide region.

[B4]
The liquid crystal display device according to [B3],
in which the light shielding material includes a metal material.

[B5]
The liquid crystal display device according to any one of [B1] to [B4],
in which the polarizer includes a wire grid polarizer.

[B6]
The liquid crystal display device according to [B5],
in which a ratio between a transmittance of the polarizer in a transmission direction and a transmittance in a direction orthogonal to the transmission direction is $3 \times 10^3$ or greater with respect to light having a wavelength of 550 nanometers.

[B7]
The liquid crystal display device according to [B5],
in which the polarizer is electrically floating.

[B8]
The liquid crystal display device according to [B5],
in which a predetermined voltage is applied to the polarizer.

[B9]
The liquid crystal display device according to [B8],
in which a same voltage as a voltage applied to the transparent pixel electrode is applied to the polarizer.

[B10]
The liquid crystal display device according to any one of [B1] to [B9],
in which another polarizer is further disposed on a back surface side of the support base.

[C1]
An electronic apparatus including a liquid crystal display device, the liquid crystal display device including:
an electrooptic substrate including a support base and transparent pixel electrodes disposed in a matrix on a front surface side of the support base;
a counter substrate disposed to be opposed to the electrooptic substrate; and
a liquid crystal material layer sealed between the electrooptic substrate and the counter substrate,
in which a light guide corresponding to each of the transparent pixel electrodes is provided on a back surface side of the transparent pixel electrode, and
a polarizer is disposed between the light guide and the transparent pixel electrode.

[C2]
The electronic apparatus according to [C1],
in which the light guide includes a light-transmissive material that extends in a normal direction with respect to the support base and is disposed such that a wall surface of the light guide is in contact with a material having a relatively low refractive index.

[C3]
The electronic apparatus according to [C1],
in which the light guide includes a light shielding material that extends in a normal direction with respect to the support base and is disposed so as to surround a wall surface of a light-transmissive material located in a light guide region.

[C4]
The electronic apparatus according to [C3], in which the light shielding material includes a metal material.

[C5]
The electronic apparatus according to any one of [C1] to [C4],
in which the polarizer includes a wire grid polarizer.

[C6]
The electronic apparatus according to [C5],
in which a ratio between a transmittance of the polarizer in a transmission direction and a transmittance in a direction orthogonal to the transmission direction is $3 \times 10^3$ or greater with respect to light having a wavelength of 550 nanometers.

[C7]
The electronic apparatus according to [C5],
in which the polarizer is electrically floating.

[C8]
The electronic apparatus according to [C5],
in which a predetermined voltage is applied to the polarizer.
[C9]
The electronic apparatus according to [C8],
in which a same voltage as a voltage applied to the transparent pixel electrode is applied to the polarizer.
[C10]
The electronic apparatus according to any one of [C1] to [C9],
in which another polarizer is further disposed on a back surface side of the support base.

REFERENCE SIGNS LIST 1, 2, 3, 9 Liquid crystal display device
11 Horizontal drive circuit
12 Vertical drive circuit
100 Electrooptic substrate
101 Support base
111 Scanning line
112 Insulating film
121 Semiconductor material layer
122 Gate insulating film
123 Contact
124 Gate electrode
125 Insulating film
126 Contact
130 Wiring layer
130A Various insulating layers constituting wiring layer
131 Light shielding film
132 Electrode
133 Contact
134 Signal line
135 Contact
136 Common potential line
137 Contact
138 Relay electrode
139 Contact
150 Polarizer
151A Metal film
151 Wire grid
152 Mask
153 Protective film
154 Void
161 Transparent pixel electrode
162 Planarization film
163 Alignment film
170 Liquid crystal material layer
171 Liquid crystal molecule
180 Counter substrate
181 Base
182 Counter electrode
183 Alignment film
184 Polarizer
SHA Light shielding region
LG Light guide
SCL Scanning line
DTL Signal line
PX Pixel
TR Thin film transistor
CS Capacitor
200 Electrooptic substrate
240 Light shielding material
300 Electrooptic substrate
350 Polarizer
950 Polarizer
400 Light source unit
410 Illumination optical system
420 Image control circuit
430 Projection optical system
440 Screen
511 Camera body
512 Imaging lens unit
513 Grip portion
514 Monitor
515 Viewfinder
611 Eyeglass-type display unit
612 Ear hooking portion
700 Eyeglasses
711 See-through head mounted display
712 Body
713 Arm
714 Lens barrel

The invention claimed is:
1. An electrooptic substrate, comprising:
a support base; and transparent pixel electrodes disposed in a matrix on a front surface side of the support base,
wherein a light guide corresponding to each of the transparent pixel electrodes is provided on a back surface side of the transparent pixel electrode, and
a polarizer is disposed between the light guide and the transparent pixel electrode,
wherein the light guide includes a light-transmissive material that extends in a normal direction with respect to the support base and is disposed such that a wall surface of the light guide is in contact with a material having a relatively low refractive index.
2. The electrooptic substrate according to claim 1,
wherein the light guide includes a light shielding material that extends in the normal direction with respect to the support base and is disposed so as to surround a wall surface of the light-transmissive material located in a light guide region.
3. The electrooptic substrate according to claim 2,
wherein the light shielding material includes a metal material.
4. The electrooptic substrate according to claim 1,
wherein the polarizer includes a wire grid polarizer.
5. The electrooptic substrate according to claim 4,
wherein a ratio between a transmittance of the polarizer in a transmission direction and a transmittance in a direction orthogonal to the transmission direction is $3 \times 10^3$ or greater with respect to light having a wavelength of 550 nanometers.
6. The electrooptic substrate according to claim 4,
wherein the polarizer is electrically floating.
7. The electrooptic substrate according to claim 4,
wherein a predetermined voltage is applied to the polarizer.
8. The electrooptic substrate according to claim 7,
wherein a same voltage as a voltage applied to the transparent pixel electrode is applied to the polarizer.
9. The electrooptic substrate according to claim 1,
wherein another polarizer is further disposed on a back surface side of the support base.
10. A liquid crystal display device, comprising:
an electrooptic substrate including a support base and transparent pixel electrodes disposed in a matrix on a front surface side of the support base;
a counter substrate disposed to be opposed to the electrooptic substrate; and a liquid crystal material layer sealed between the electrooptic substrate and the counter substrate, wherein a light guide corresponding to each of the transparent pixel electrodes is provided on a back surface side of the transparent pixel electrode, and a polarizer is disposed between the light guide and the transparent pixel electrode, wherein the light guide includes a light-transmissive material that extends in a normal direction with respect to the support base and is disposed such that a wall surface of the light guide is in contact with a material having a relatively low refractive index.

11. An electronic apparatus including a liquid crystal display device, the liquid crystal display device, comprising:

an electrooptic substrate including a support base and transparent pixel electrodes disposed in a matrix on a front surface side of the support base;

a counter substrate disposed to be opposed to the electrooptic substrate; and a liquid crystal material layer sealed between the electrooptic substrate and the counter substrate, wherein a light guide corresponding to each of the transparent pixel electrodes is provided on a back surface side of the transparent pixel electrode, and a polarizer is disposed between the light guide and the transparent pixel electrode, wherein the light guide includes a light-transmissive material that extends in a normal direction with respect to the support base and is disposed such that a wall surface of the light guide is in contact with a material having a relatively low refractive index.

* * * * *